(12) United States Patent
Zhu et al.

(10) Patent No.: US 8,209,744 B2
(45) Date of Patent: Jun. 26, 2012

(54) MOBILE DEVICE ASSISTED SECURE COMPUTER NETWORK COMMUNICATION

(75) Inventors: Bin Zhu, Edina, MN (US); Min Feng, Beijing (CN); Xu Yin, Beijing (CN); Yang Yang, Xuzhou (CN); Yao Zhang, Beijing (CN); Jun Shao, State College, PA (US)

(73) Assignee: Microsoft Corporation, Redmond, WA (US)

( * ) Notice: Subject to any disclaimer, the term of this patent is extended or adjusted under 35 U.S.C. 154(b) by 1076 days.

(21) Appl. No.: 12/122,126

(22) Filed: May 16, 2008

(65) Prior Publication Data

US 2009/0287921 A1 Nov. 19, 2009

(51) Int. Cl.
*G06F 21/00* (2006.01)
(52) U.S. Cl. .................. 726/5; 726/2; 726/7; 713/155; 713/167; 713/172; 380/44; 705/5
(58) Field of Classification Search .................. 713/155, 713/167; 726/5
See application file for complete search history.

(56) References Cited

U.S. PATENT DOCUMENTS

| | | | | |
|---|---|---|---|---|
| 7,299,503 | B2* | 11/2007 | Ballard | 726/29 |
| 7,363,500 | B2* | 4/2008 | Funk | 713/180 |
| 7,379,921 | B1* | 5/2008 | Kiliccote | 705/75 |
| 7,606,560 | B2* | 10/2009 | Labrou et al. | 455/411 |
| 2001/0037407 | A1* | 11/2001 | Dragulev et al. | 709/250 |
| 2002/0018570 | A1* | 2/2002 | Hansmann et al. | 380/270 |
| 2003/0236983 | A1* | 12/2003 | Mihm, Jr. | 713/172 |
| 2004/0097217 | A1 | 5/2004 | McClain | |
| 2004/0187018 | A1 | 9/2004 | Owen et al. | |
| 2005/0268107 | A1* | 12/2005 | Harris et al. | 713/182 |
| 2006/0069916 | A1* | 3/2006 | Jenisch et al. | 713/172 |
| 2006/0218396 | A1* | 9/2006 | Laitinen et al. | 713/167 |
| 2006/0256961 | A1* | 11/2006 | Brainard et al. | 380/44 |

(Continued)

FOREIGN PATENT DOCUMENTS

EP 1802155 A1 6/2007

(Continued)

OTHER PUBLICATIONS

Hallsteinsen et al., "Using the mobile phone as a security token for unified authentication", Systems and Networks Communications, 2007. ICSNC 2007. Second International Conference on, Issue Date: Aug. 25-31, 2007, on pp. 68-68.*

(Continued)

*Primary Examiner* — Taghi Arani
*Assistant Examiner* — Morshed Mehedi
(74) *Attorney, Agent, or Firm* — Lyon & Harr, LLP; Richard T. Lyon

(57) ABSTRACT

Mobile device assisted secure computer network communications embodiments are presented that employ a mobile device (e.g., a mobile phone, personal digital assistant (PDA), and the like) to assist in user authentication. In general, this is accomplished by having a user enter a password into a client computer which is in contact with a server associated with a secure Web site. This password is integrated with a secret value, which is generated in real time by the mobile device. The secret value is bound to both the mobile device's hardware and the secure Web site being accessed, such that it is unique to both. In this way, a different secret value is generated for each secure Web site accessed, and another user cannot impersonate the user and log into a secure Web site unless he or she knows the password and possesses the user's mobile device simultaneously.

20 Claims, 18 Drawing Sheets

U.S. PATENT DOCUMENTS

| | | | |
|---|---|---|---|
| 2007/0011261 | A1 | 1/2007 | Madams et al. |
| 2007/0044143 | A1* | 2/2007 | Zhu et al. .......................... 726/8 |
| 2007/0136573 | A1 | 6/2007 | Steinberg |
| 2007/0169181 | A1* | 7/2007 | Roskind ............................ 726/5 |
| 2007/0186099 | A1 | 8/2007 | Beck et al. |

FOREIGN PATENT DOCUMENTS

| | | |
|---|---|---|
| EP | 1881665 A1 | 1/2008 |
| WO | WO2007145540 A2 | 12/2007 |

OTHER PUBLICATIONS

"International Search Report", Filed Date May 15, 2009, Application No. PCT/US2009/044262, pp. 1-10.

Al-Qayedi, A., W. Adi, A. Zahro, A. Mabrouk, Combined web/mobile authentication for secure Web access control, Wireless Communications and Networking Conf., Mar. 2004, pp. 677-681, vol. 2.

Anti-Phishing Working Group, Phishing activity trends report, Nov. 2006.

Balfanz, D., E. W. Felten, Hand-held computers can be better smart cards, Proc. of the 8th Conf. on USENIX Security Symposium, Aug. 1999, pp. 15-24, vol. 8.

Bellare, M., D. Pointcheval, P. Rogaway, Authenticated key exchange secure against dictionary attacks, Proc. of the Int'l Conf. on the Theory and Application of Cryptographic Techniques, EUROCRYPT 2000, May 2000, pp. 139-155, Bruges, Belgium.

Bellovin, S. M., M. Merritt, Encrypted key exchange: Password-based protocols secure against dictionary attacks, Proc. of the IEEE Symposium on Research in Security and Privacy, May 1992, pp. 72-84, Oakland, CA.

Biryukov, A., J. Lano, B. Preneel, Cryptanalysis of the alleged SecurID hash function, Selected Areas in Cryptography, 10th Annual International Workshop, SAC 2003, Aug. 2003, pp. 130-144, Ottawa, Canada.

Biryukov, A., J. Lano, B. Preneel, Recent attacks on alleged SecurID and their practical implications, Computers & Security, vol. 24, No. 5, Aug. 2005, pp. 364-370.

Bresson, E., O. Chevassut, D. Pointcheval, Security proofs for an efficient password-based key exchange, Proc. of the 10th ACM Conf. on Comp. and Comm. Security, Oct. 2003, pp. 241-250, Washington, DC, USA.

Contini, S., Y. L. Yin, Fast software-based attacks on SecurID, 11th Int'l Workshop on Fast Software Encryption, Feb. 2004, pp. 454-471, Springer, Delhi, India.

Dasgupta, P., K. Chatha, and E. K. S. Gupta, Personal authenticators: Identity assurance under the viral threat model, draft, 2006, retrieved from http://cactus.eas.asu.edu/Partha/Papers-PDF/2006/PersonalAuthenticator.pdf.

Di Pietro, R., G. Me, M. A. Strangio, A two-factor mobile authentication scheme for secure financial transactions, Int'l Conf. on Mobile Business, Jul. 2005, pp. 28-34, Sydney, Australia.

Duncan, R. G., M. M. Shabot, Secure remote access to a clinical data repository using a wireless personal digital assistant (PDA), Proc. AMIA Annual Symposium, Nov. 2000, pp. 210-214.

Federal Financial Institutions Examination Council, Authentication in an Internet banking environment, Oct. 12, 2005.

Goldreich, O., Y. Lindell, Session-key generation using human passwords only, J. Cryptology, Jul. 2006, pp. 241-340, vol. 19, No. 3.

ICBC China, USB-Shield—Your internet banking security guard, retrieved Jan. 21, 2008 from http://www.icbc.com.cn/icbc/html/e_guanggao/udun/udun_e.html.

Jackson, C., C., D. Boneh, J. Mitchell, Spyware resistant web authentication using virtual machines, 2006, http://crypto.stanford.edu/spyblock/spyblock.pdf.

Katz, J., R. Ostrovsky, M. Yung, Efficient password-authenticated key exchange using human-memorable passwords, Proc. of the Int'l Conf. on the Theory and Application of Cryptographic Techniques, May 2001, pp. 475-494, Innsbruck, Austria.

Katz, J., R. Ostrovsky, M. Yung, Forward secrecy in password-only key exchange protocols, Third Int'l Conf. on Security in Communication Networks, Sep. 2002, pp. 29-44, Amalfi, Italy.

Kobara, K., H. Imai, Pretty-simple password-authenticated key-exchange protocol, CoRR, Oct. 2001.

Mannan, M., P. C. van Oorschot, Using a personal device to strengthen password authentication from an untrusted computer, 11th Int'l Conf. on Financial Cryptography and Data Security and 1st Int'l Workshop on Usable Security, Feb. 2007, pp. 88-103, Scarborough, Trinidad and Tobago.

Margolin, N. B., M. K. Wright, B. N. Levine, Guardian: A framework for privacy control in untrusted environments, Technical Report 04-37, Jun. 2004.

Moshchuk, A., T. Bragin, S. D. Gribble, H. M. Levy, A crawler-based study of spyware in the web, Proc. of the Network and Distributed System Security Symposium, Feb. 2006, San Diego, California, USA.

Netcraft, Inc., More than 450 phishing attacks used SSL in 2005, retrieved Jan. 21, 2008 from http://news.netcraft.com/archives/2005/12/28/more_than_450_phishing_attacks_used_ssl_in_2005.html.

Netcraft, Inc., Phishing attacks continue to grow in sophistication, retrieved Jan. 21, 2008 from http://news.netcraft.com/archives/2007/01/15/phishing_attacks_continue_to_grow_in_sophistication.html.

Parno, B., C. Kuo, A. Perrig, Phoolproof phishing prevention, 10th Int'l Conf. on Financial Cryptography and Data Security, Authentication and Fraud Detection, Feb. 27-Mar. 2, 2006, pp. 1-19, Anguilla, British West Indies, Springer.

Pullar-Strecker, T., NZ bank adds security online, Sydney Morning Herald, Nov. 8, 2004.

Ross, B., C. Jackson, N. Miyake, D. Boneh, J. C. Mitchell, Stronger password authentication using browser extensions, Proc. of the 14th Conf. on USENIX Security Symposium, Jul. 31-Aug. 5, 2005, vol. 14, pp. 17-32, USENIX Association Berkeley, CA, USA.

RSA Security Inc., A comprehensive introduction to RSA SecurID user authentication, Jun. 2007.

Sharp, R., J. Scott, A. R. Beresford, Secure mobile computing via public terminals, Proc. of the 4th Int'l Conf. on Pervasive Computing, May 2006, pp. 238-253, Dublin, Ireland.

Wu, M., S. Garfinkel and R. Miller, Secure web authentication with mobile phones, DIMACS Workshop on Usable Privacy and Security Software, Jul. 2004.

Xie, G. G., C. E. Irvine, T. E. Levin, Quantifying effect of network latency and clock drift on time-driven key sequencing, 22nd Int'l Conf. on Distributed Computing Systems, Jul. 2002, pp. 35-42, Vienna, Austria.

Zhang, M., New approaches to password authenticated key exchange based on RSA, Proc. of Asiacrypt, Dec. 2004, vol. 3329, pp. 230-244, Springer-Verlag.

Zhang, M., Password authenticated key exchange using quadratic residues, Proc. of the Second Int'l Conf. on Applied Cryptography and Network Security, Jun. 2004, pp. 233-247, Yellow Mountain, China.

* cited by examiner

MOBILE DEVICE ASSISTED SECURE COMPUTER NETWORK COMMUNICATION

BACKGROUND

People are increasingly dependent on the Internet and in particular on the World Wide Web. For example, the Web is often used to access emails, conduct business, purchase goods and services, and for online banking, to name just a few things. Many of these activities involve interaction with a Web service via a Web site.

Web services often require proper user authentication to identify a user and establish secure channels with a client computer, such as a user's personal computer (PC). A Web site associated with this type of Web service is sometimes referred to as a secure site. Although many secure authentication schemes have been proposed, a password is still dominantly used in Web applications due to its convenience, and ease in use and deployment. In password-based user authentication, a user is required to input an account identification (often referred to as a user ID) and a password. A Secure Sockets Layer (SSL) connection may be used to secure communications during user authentication.

Paramount to a user ID-password authentication scheme is maintaining security. This includes safeguarding not only the login credentials, but also sensitive data transmissions and critical interactions.

SUMMARY

The mobile device assisted secure computer network communications embodiments described herein employ a mobile device that a user typically already carries with him or her (e.g., a mobile phone, personal digital assistant (PDA), and the like), to assist in user authentication and fortify the security in interacting with secure Web sites. In this way, a user can access secure Web sites with any computer, even an untrusted one. In general, the mobile device assisted user authentication is implemented by having a user enter a password into a client computer which is in contact with a secure Web site the user is attempting to access. This password is integrated with a secret value generated in real time by the user's mobile device. The secret value is not stored in the mobile device. In addition, the secret value can be bound to both the mobile device's hardware and the secure Web site being accessed, such that it is unique to both. In this way, a different secret value is generated for each secure Web site accessed, and an adversary cannot impersonate the user and log into a secure Web site unless he or she knows the password and possesses the user's mobile device simultaneously.

In one general implementation of this secure user authentication, the client computer transmits a user's request to access a secure Web site to the server associated with that site. The server then initiates an SSL session with the client computer, and submits a user authentication request to the client computer. The server also generates a server challenge number. The server then transmits a server identification and the server-generated challenge number to the client computer. The client computer prompts the user to enter a user identification and password previously established for the Web site being accessed. The client computer then inputs the user identification and password entered by the user, and provides the user identification, server identification and the server-generated challenge number to the mobile device. The mobile device then generates the aforementioned secret value, a mobile device challenge number and a representation of the secret value. Next, the mobile device forwards the mobile device challenge number and secret value representation to the client computer. The client computer combines the secret value representation and the password to produce a combined representation. The client computer then transmits the user identification, mobile device challenge number and combined representation to the server. The server receives these numbers and computes a session key from them. The server then computes a server version of the secret value representation as a combination comprising the session key, the user identification and the server identification. The server then computes a server version of the combined representation using the user identification, the server identification, the server version of the secret value representation, and the password known to the server. Next, the server compares the server version of the combined representation to the combined representation received from the client computer, and determines if the password and secret value known to the server were used to generate the combined representation received from the client computer. If so, the server transmits a notice to the client computer granting access. If not, the server sends a notice to the client computer denying access. The client computer informs the user as to whether access to said network site has been granted or not.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description reference is made to the accompanying drawings which form a part hereof, and in which are shown, by way of illustration, specific embodiments which may be practiced. It is understood that other embodiments may be utilized and structural changes may be made without departing from the scope of the invention.

1.0 Mobile Device Assisted Secure Computer Network Communications

The mobile device assisted secure computer network communications embodiments described herein provide security for interactions with secure Web sites. This is generally accomplished by employing a mobile personal device that a user typically already carries with him or her (e.g., a mobile phone, personal digital assistant (PDA), and the like), to assist in user authentication and optionally the transfer of high security data over the Internet. In this way, a user can access secure Web sites with any client computer, even an untrusted one. For example, the client computer could be a public personal computer (PC) in an Internet cafe or library, or a borrowed PC belonging to someone else. Such PCs could be infected with keyloggers or other malicious software.

Figure 1:
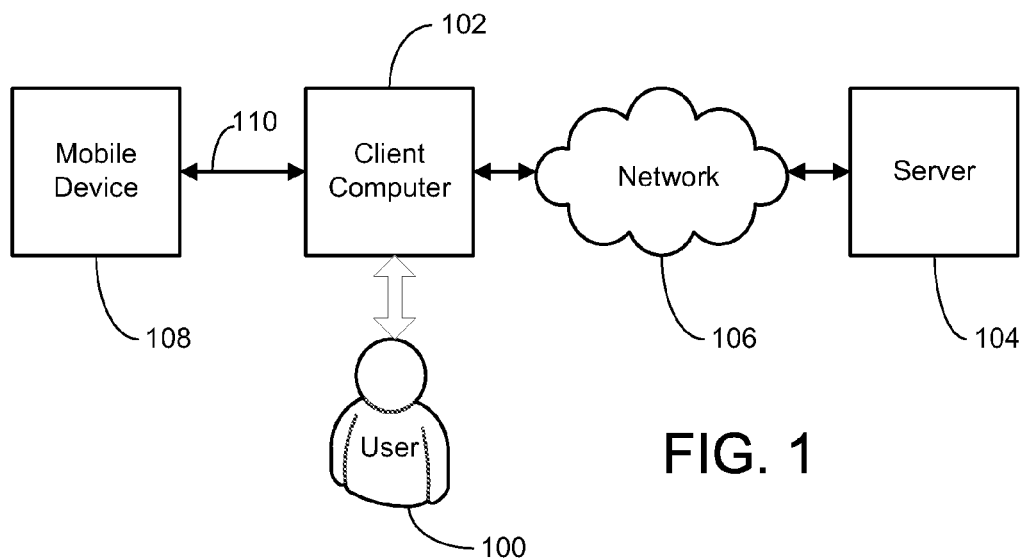
FIG. 1 is a simplified architectural diagram of a Web-based networking environment that includes a mobile device in addition to a client computer and server.

Before the mobile device assisted secure computer network communications embodiments are presented, a general description of a suitable Web-based networking environment in which portions thereof may be implemented will be described. Referring to FIG. 1, a user 100 of a client computer 102 uses a browser on the client computer to connect to a server 104 via a network 106 (e.g., the Internet) to request access to a secure Web site associated with the server. The server 104 requires user authentication before allowing access. To assist in the user authentication, a mobile device 108, which is in the possession of the user, is employed. The mobile device 108 is in communication with the client computer 102 via any appropriate connection 110. For example, a wired connection employing a USB cable could be used. Another example of an appropriate connection would be a wireless connection, such as one employing Bluetooth. In one embodiment, there is no direct communication between the mobile device 108 and the server 104 such that communications between these two entities 104, 108 are through the client computer 102. It is also noted that the foregoing networking environment is only an example of a suitable environment. Other architectures providing similar communication schemes can be employed as well.

1.1 Secure User Authentication

One implementation of the mobile device assisted secure computer network communications embodiments involves secure user authentication. As stated previously, user authentication to identify a user and establish secure channels with a client computer is often a prerequisite to accessing a secure Web site. In this implementation of secure user authentication, a password entered by a user in a client computer is integrated with a secret value generated in real time by a user's mobile device. In one embodiment, the secret value is not stored in the mobile device. In addition, the secret value can be bound to both the mobile device's hardware and the secure Web site being accessed, such that it is unique to both. In this way, a different secret value is generated for each secure Web site accessed, and another user, authorized or not, cannot impersonate the user and log into a secure Web site unless he or she knows the password and possesses the user's mobile device simultaneously.

1.1.1 Setup

A user can first establish an account with a Web site via its associated server. This includes generating a unique user ID and a password, as well as a secret value. Selecting and sharing a unique user ID and a password between the user and the Web site are done in the typical manner, usually via a client computer. The sharing of the secret value generated in real time from the user's mobile device, however, is unique. To achieve this, a user obtains a copy of a secret value generation program through a trusted channel and installs the program on a mobile device. The obtained copy is individualized to hide a number $R_m$. In one embodiment, $R_m$ is generated from unique information about the mobile device's hardware obtained during downloading interactions, and a master key known only to the downloading center. For example, if the mobile device is a mobile telephone with a Subscriber Identification Module (SIM) card, the aforementioned information can pertain to both the phone's hardware and the SIM card.

In one embodiment, obfuscation is used to prevent extraction of the hidden number $R_m$ from the mobile device's executable files. Alternately, if the mobile device is equipped with a Trusted Platform Module (TPM), there is no need to perform the aforementioned individualization and obfuscation. $R_m$ can be protected by TPM and secret value generation program protected by the TPM-based system. Individualization or obfuscation is also not needed if the mobile device is assumed to be free of spyware and other malicious software.

Figure 2:
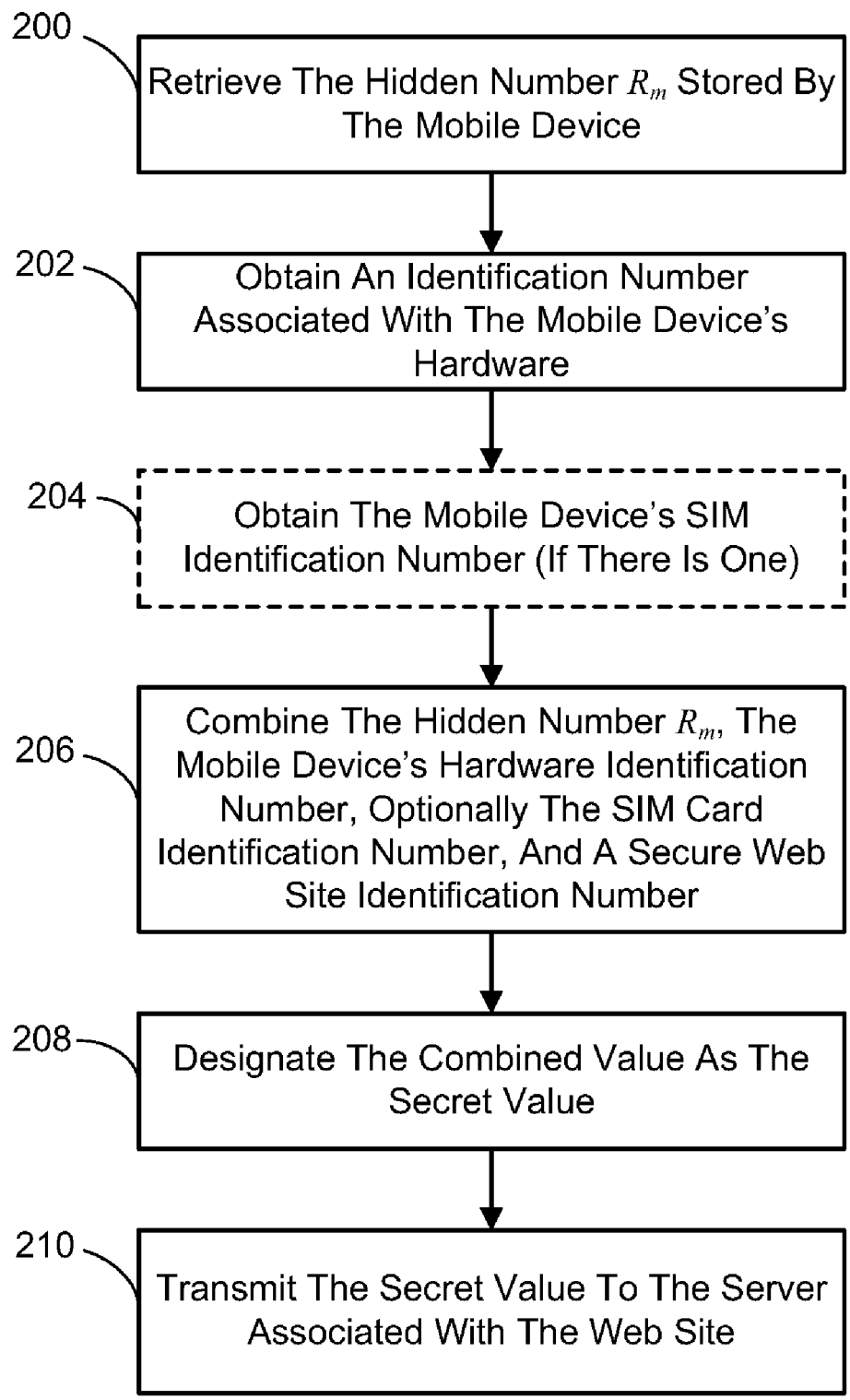
FIG. 2 is a flow diagram generally outlining one embodiment of a setup process where the mobile device generates a secret value and provides it to the server associated with a secure Web site.

When a secure Web site is first visited by a user via a client computer (e.g., 102 of FIG. 1) which is in communication with the mobile device (e.g., 108 of FIG. 1) having both the hidden number $R_m$ and a copy of the secret value generation program, a setup procedure can be performed. This can involve the mobile device generating the secret value and providing it to the server (e.g., 104 of FIG. 1) associated with a Web site. More particularly, referring to FIG. 2, the prerequisite setup begins with the mobile device generating the secret value using the downloaded secret value generation program by first retrieving the hidden number $R_m$ stored by the mobile device 200. Next, an identification number associated with the mobile device's hardware is obtained (202). Such numbers are readily obtainable from the operating system of most modern mobile devices. In addition, if the mobile device has a SIM card, a SIM identification number can optionally be obtained (204). Here again, the SIM identification number is a number routinely embedded in a SIM card and easily obtainable from the card. It is noted that the optional nature of this last action is indicated by the use of a broken line box in FIG. 2. It is further noted that in one embodiment, the SIM card identification number could be used alone without the mobile device's identification number in an alternate embodiment of the secret value generation procedure (not shown). In another embodiment, only the SIM card is used in generating the secret value, and a user can use another mobile device with the same SIM card inserted. In yet another embodiment, only the mobile phone hardware is used, and a user can use his or her mobile device with a different SIM card. However, using both the hardware and SIM card identifications has the added security advantage of requiring both the mobile device and SIM card to be present. Thus, for example, a cloned SIM card would be useless without the mobile device for generating the correct secret value.

The procedure continues with action 206 by combining the hidden number $R_m$, the mobile device's hardware identification number, optionally the SIM card identification number, and finally a unique number identifying the secure Web site of interest (e.g., the Web site's URL). In one embodiment, the combination is accomplished by concatenating the numbers and then computing a cryptographic hash of the concatenation using a prescribed cryptographic hash function (e.g., SHA-256 specified in Federal Information Processing Standards Publications (FIPS PUBS) 180-2 Secure Hash Standard), which is known to the mobile phone and the server associated with the Web site of interest. The resulting combined value is designated as the secret value (208) and is transmitted to the server associated with the Web site via a secure channel (210). The server stores the secret value securely for future user authentication purposes. It is noted, however, that the secret value is not stored locally in the mobile device. It is re-generated each time the user attempts to access the secure Wed site involved in the set-up procedure, as will be described in sections to follow.

It is also noted that using the mobile device's hardware identification number (and/or possibly a SIM identification number) as part of generating the secret value makes the value unique to the mobile device. Other mobile devices will have different hardware (and/or SIM) identification numbers, and so will generate a different secret value. In addition, since a Web site identification number (e.g., its URL) is used in the generation of the secret value, the value will also be unique to the Web site. A different secure Web site will have a different identification number and so will result in a different secret value being generated. Given the foregoing, it is further noted that when a user changes his or her mobile device (and/or SIM card if one is present), or when the device is lost, the above set-up procedure must be repeated to re-establish a new secret value with the server associated with each secure Web site of interest.

1.1.2 User Authentication Process

In one embodiment of the secure user authentication, when a user sends a request to access a secure Web site, the server associated with the site establishes an SSL session with the client computer that the user is employing. The server submits a request via the client computer for the user to authenticate him or herself to the server. The user enters his or her user ID and password as usual. The client computer also passes the user authentication request to the user's mobile device, which is in communication with the client computer via a local wired or wireless connection. In one variation, the user is required to press a button on the mobile device to cause the mobile device to generate additional login credentials based on the aforementioned secret value shared with the Web site. These additional credentials are then sent to the client computer which combines them with the password and transmits them via the network to the server associated with the Web site for authentication. If the user is successfully authenticated, the server grants the user access rights.

Figure 3A:
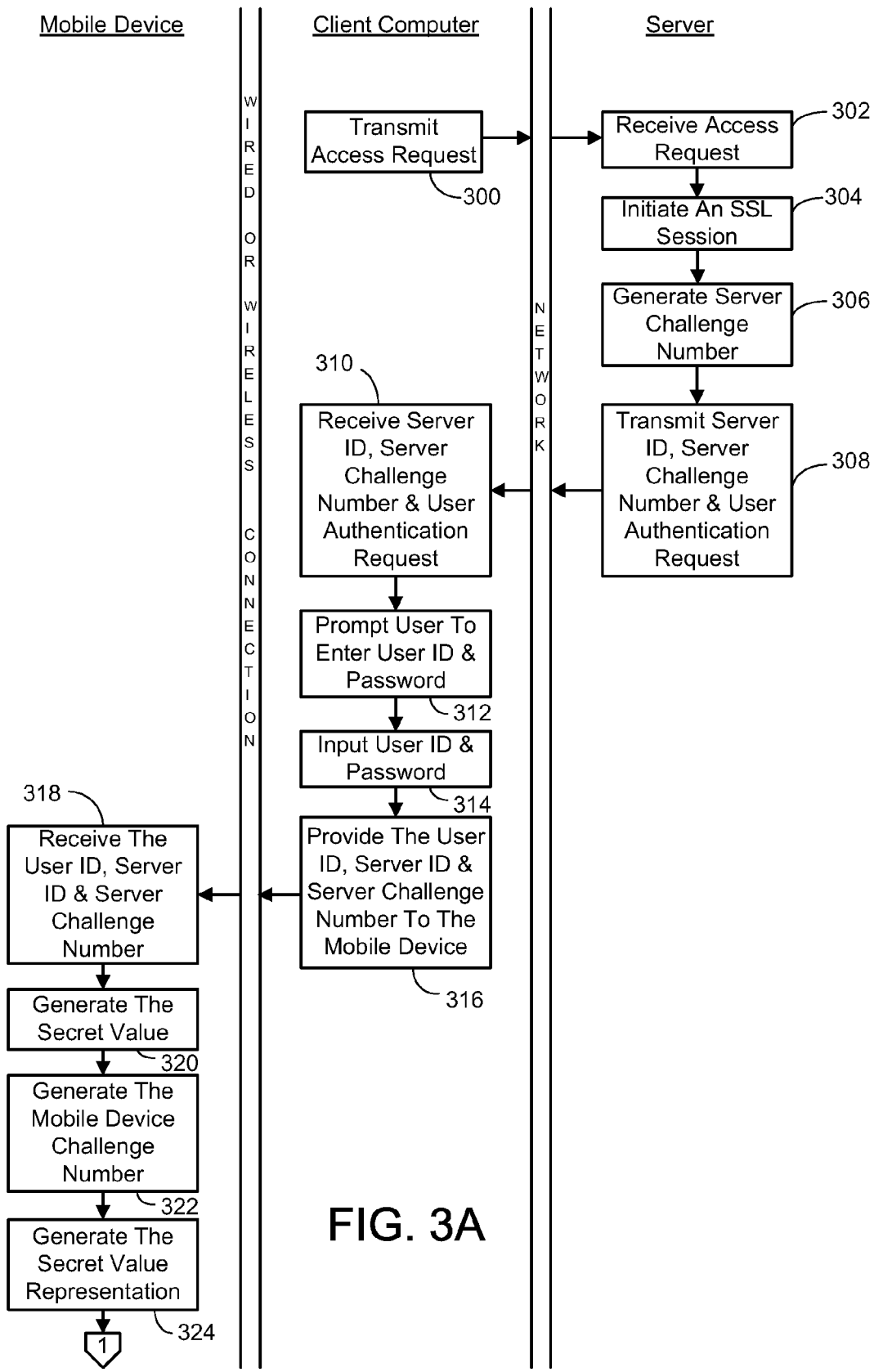
FIGS. 3A-C depict a continuing flow diagram generally outlining an implementation of a user authentication process.
Figure 3B:
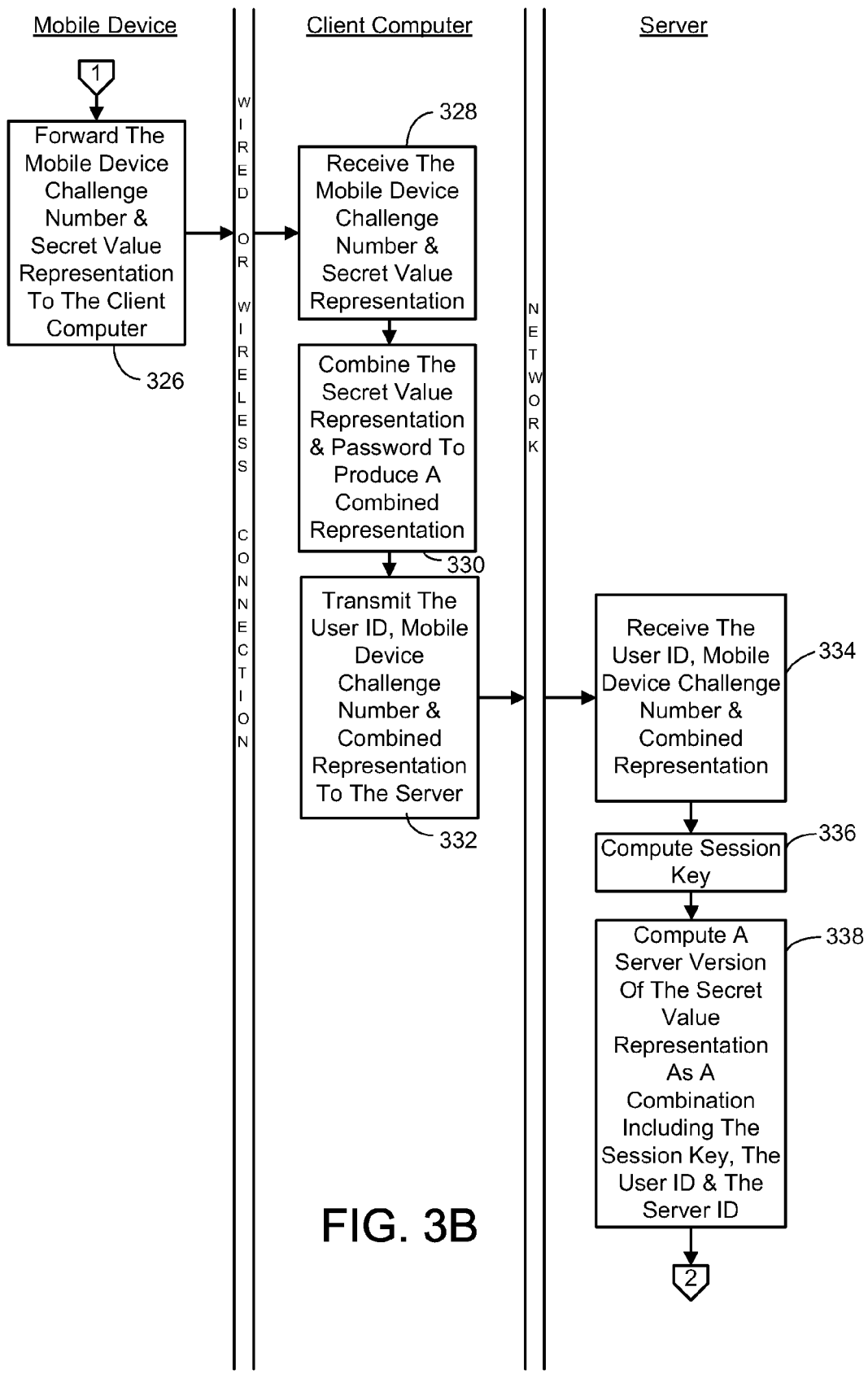
Figure 3C:
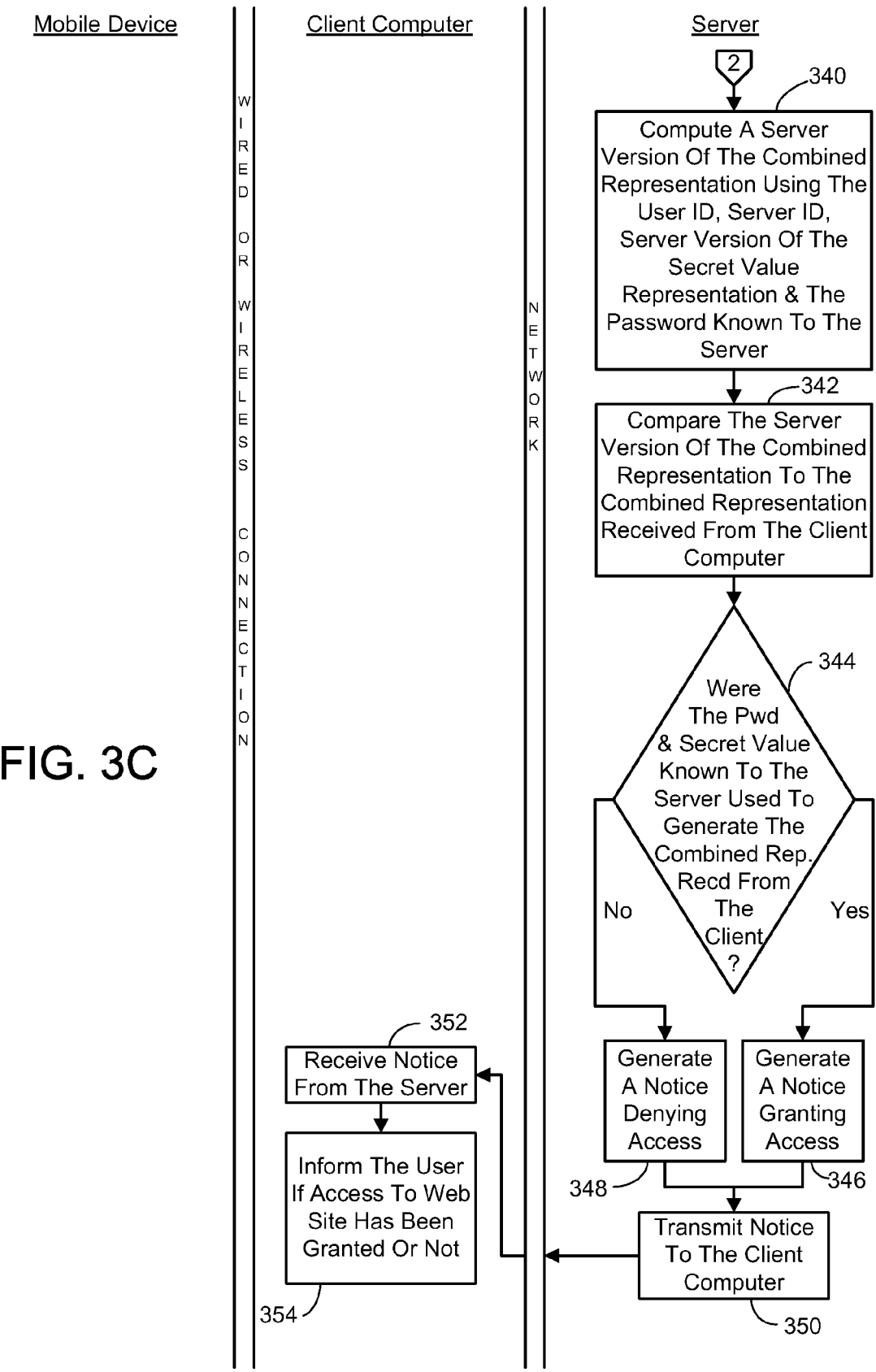

A process implementing the foregoing secure user authentication is shown in FIGS. 3A-C. The process begins when the client computer transmits a user's request to access a secure Web site to the server associated with that site (300). The server receives the access request (302) and initiates an SSL session with the client computer (304). The server then generates a server challenge number (306). This challenge number can take several forms, two of which will be described shortly. The server then transmits a server identification and the server-generated challenge number, along with a user authentication request, to the client computer (308). The client computer receives the server identification, server challenge number and user authentication request (310), and prompts the user to enter a user identification and password previously established for the Web site being accessed (312). The client computer then inputs the user identification and password entered by the user (314), and provides the user identification, server identification and the server-generated challenge number to the mobile device (316). The mobile device receives the identifications and number (318), and then generates the aforementioned secret value (320), a mobile device challenge number (322) and a representation of the secret value (324). Next, the mobile device forwards the mobile device challenge number and secret value representation to the client computer (326). It is noted that the mobile device can be prompted to produce the foregoing values in a number of ways. For example, simply receiving the identifications and server challenge number from the client computer could be enough to initiate the process. Or, as indicated previously, this task might involve the user pressing a prescribed button on the mobile device. It is also noted that the mobile device challenge number and secret value representation can take several forms, some of which will be described shortly.

The client computer receives the mobile device challenge number and secret value representation (328), and combines the secret value representation and the password to produce a combined representation (330). The client computer then transmits the user identification, mobile device challenge number and combined representation to the server (332). The serve receives these numbers (334) and computes a session key from them (336) as will be described in more detail later. The server then computes a server version of the secret value representation as a combination including the session key, the user identification and the server identification (338). The server then computes a server version of the combined representation using the user identification, the server identification, the server version of the secret value representation, and the password known to the server (340). The server then compares the server version of the combined representation to the combined representation received from the client computer (342) and determines if the password and secret value known to the server were used to generate the combined representation received from the client computer (344). If so, the server generates a notice granting access (346). If not, the server generates a notice denying access (348). The server transmits the generated notice to the client computer (350). The client computer receives the notice from the server (352) and informs the user as to whether access to the network site has been granted or not (354).

1.2 Server Authentication

Another implementation of the mobile device assisted secure computer network communications embodiments involves the server being authenticated as well as the user. This allows the client computer and mobile device to confirm they are communicating with the genuine server associated with the secure Web site being accessed. In this implementation, the server returns authentication credentials to the client computer, as well as to the mobile device via the client computer. Both the client computer and mobile device authenticate the server, and terminate the session if the server authentication fails. At the end of this mutual authentication scheme, both the client computer and the mobile device will have established separate secure channels with the server.

Figure 4A:
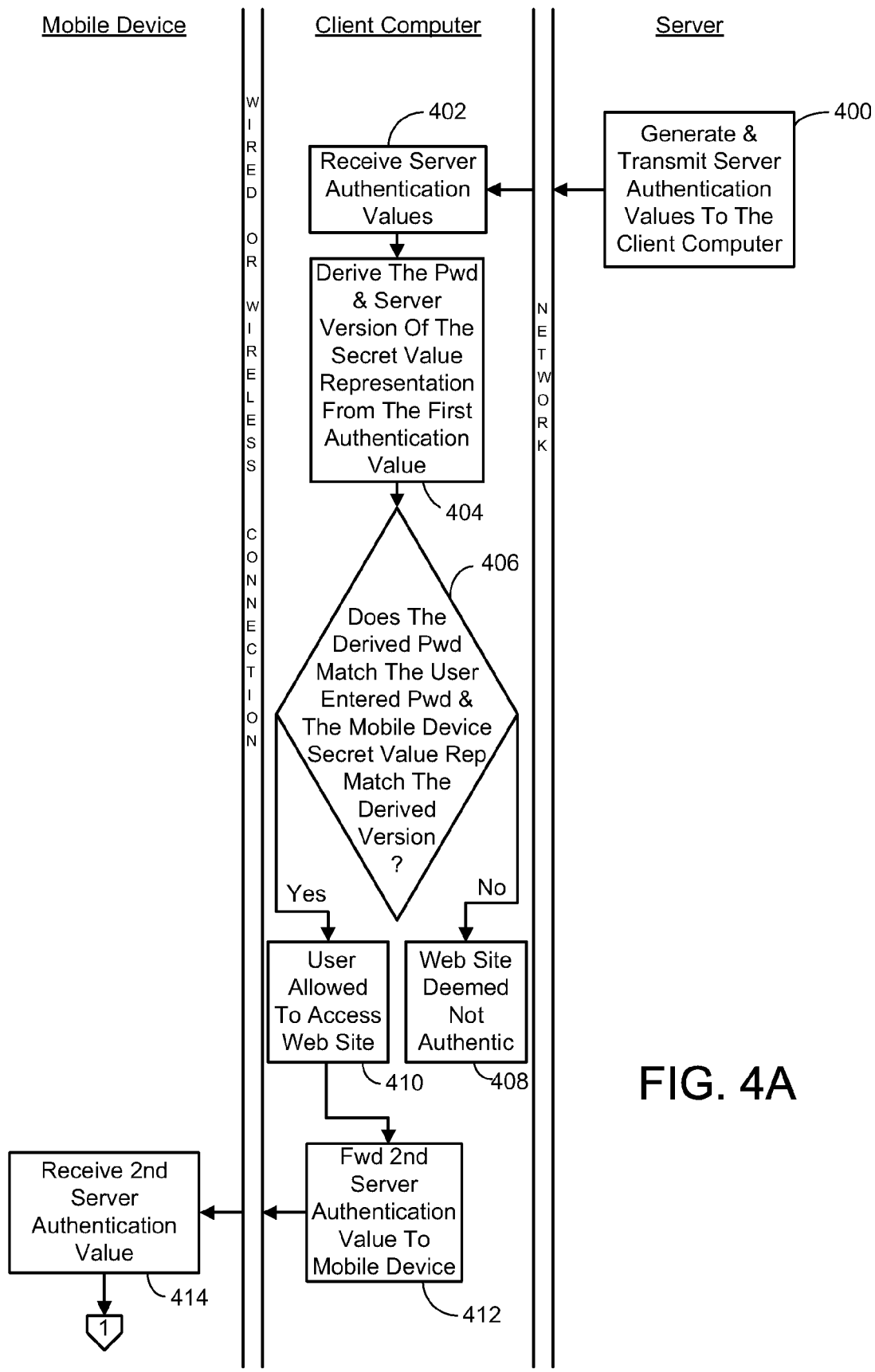
FIGS. 4A-B depict a continuing flow diagram generally outlining an implementation of a server authentication process.
Figure 4B:
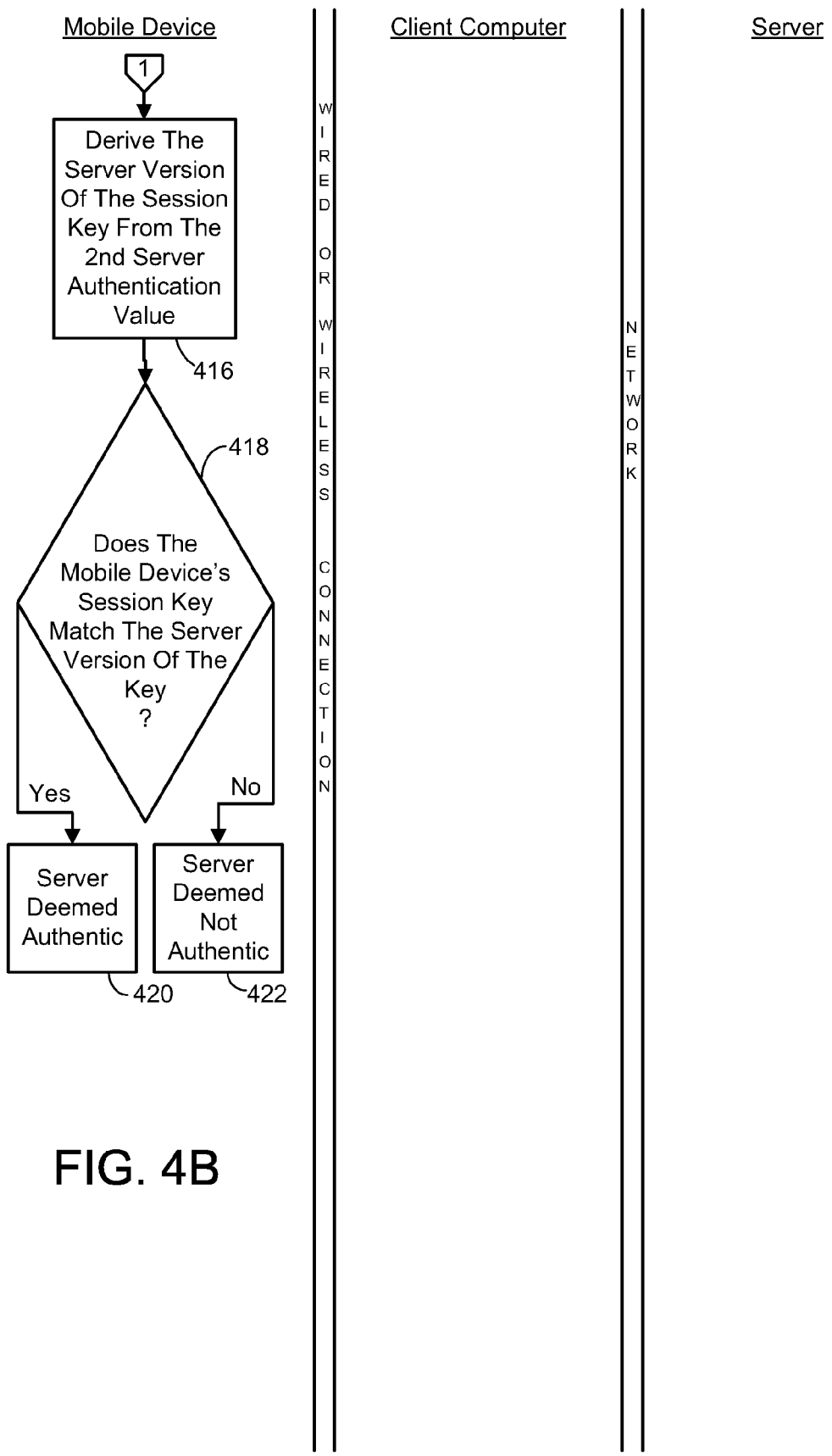

One embodiment of a process for achieving the foregoing server authentication is shown in FIGS. 4A-B. Once access has been granted to the user to access the Web site, the server first generates and transmits two server authentication values to the client computer (400). In one implementation, the first value is for the client computer. This first value is a combination including the password known to the server and the aforementioned server-generated version of the secret value representation. The second value is for the mobile device. This second value is a combination including a server-generated version of the session key. The client computer receives the server authentication values (402), and derives the password and server-generated version of the secret value representation from the first value (404). The client computer then determines if the password derived from the server-generated combination matches the password entered by the user and the aforementioned mobile device-generated secret value representation matches the server-generated version of the secret value representation (406). If they do not match, then the Web site is deemed not to be authentic and the user is not allowed to access it (408). However, if they do match, the user is allowed to access the Web site associated with the server (410), and the second server authentication value is forwarded to the mobile device (412). The mobile device receives the second server authentication value (414) and derives the server-generated version of the session key from it (416). The mobile device then determines if the mobile device-generated session key matches the server-generated version of the session key (418). If it does, the server is deemed to be authentic (420). Otherwise, it is deemed not to be authentic (422).

It is noted that in some embodiments of the mobile device assisted secure computer network communications, when the server authenticates the user and the mobile device authenticates the server, communication of prescribed high security data is allowed between the server and the mobile device via the client computer. These embodiments will be described in a later section.

1.3 Authentication with Forward Security

The following is a process directed at one implementation of the above-described user and server authentication. Namely, one which satisfies forward security. Forward security means that if the secret value l is compromised, the previous communications between the mobile phone and the server are still secure.

Figure 5A:
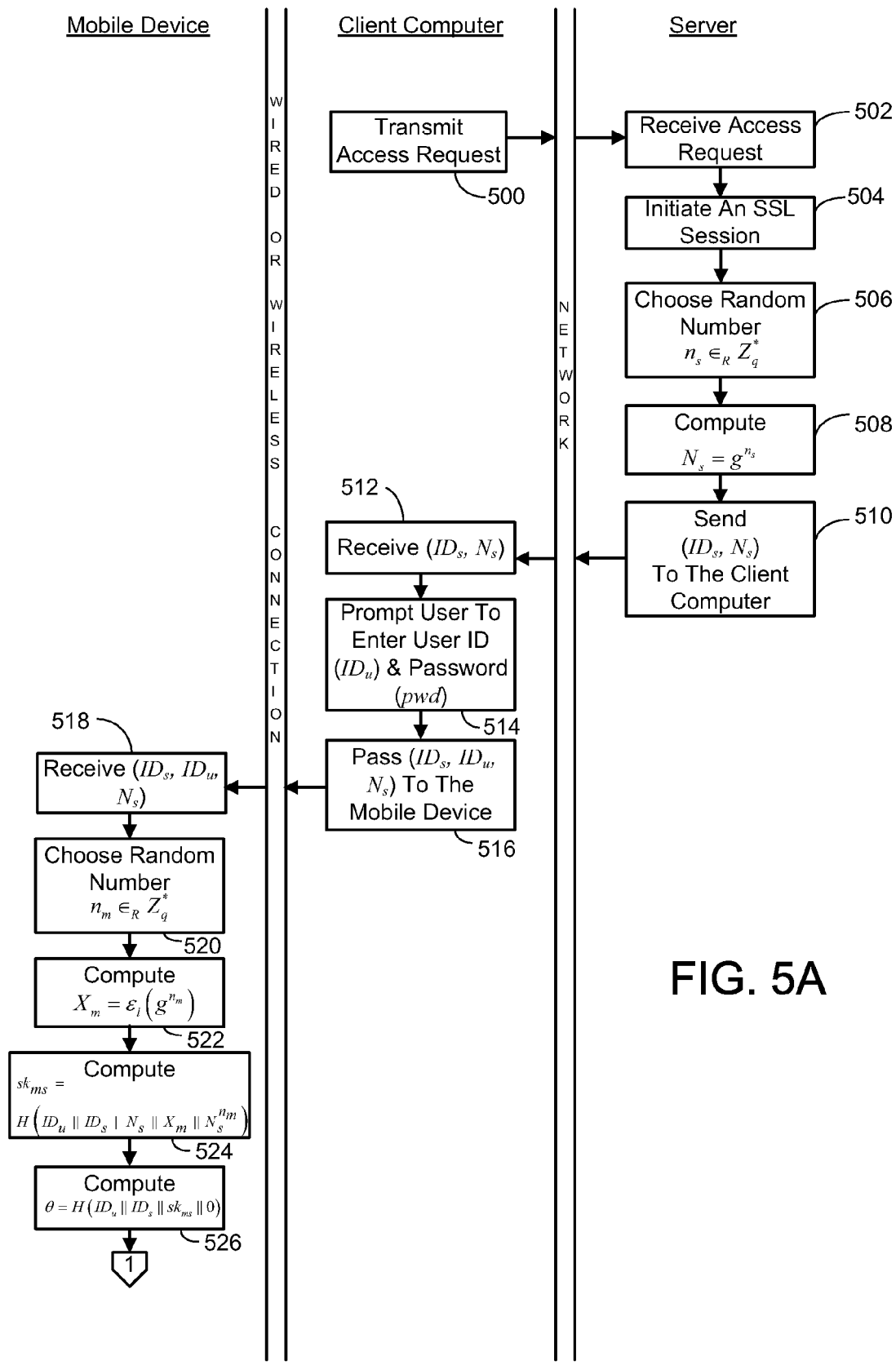
FIGS. 5A-B depict a continuing flow diagram outlining one variation of the user authentication process of FIGS. 3A-C, which satisfies forward security.
Figure 5B:
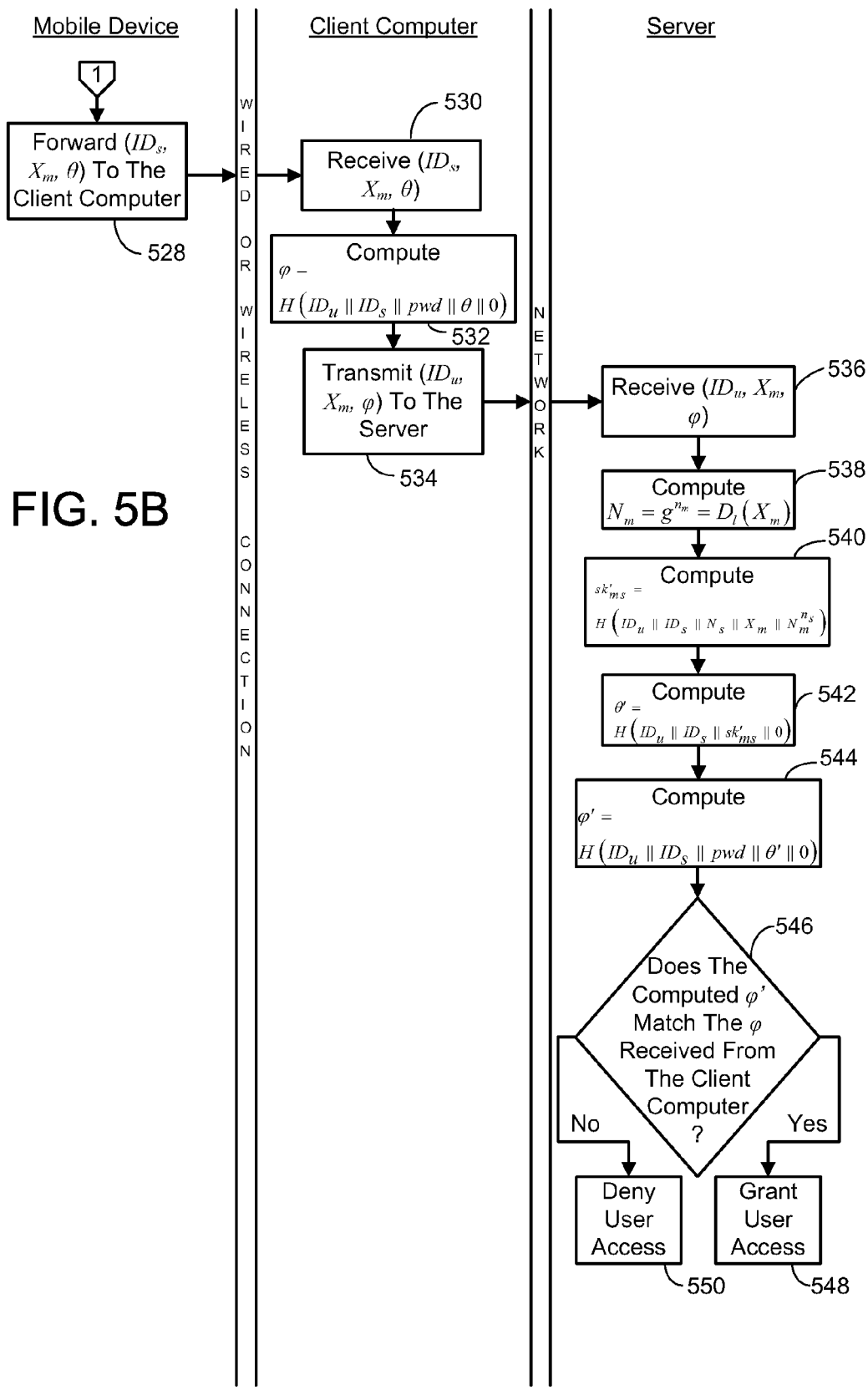

Referring to FIGS. 5A-B, the process begins with the client computer sending an access request to the server associated with the Web site that a user wants to access (500). The server receives the request (502) and establishes a SSL session between the server and the client computer to create a secure channel that all subsequent communications between them will use (504). The server then chooses a random number $n_s \in_R Z^*_q$ (506), computes $N_s = g^{n_s}$ (508), and sends $N_s$ to the client computer with its identity $ID_s$ through the secure channel (510). It is noted that the symbol $\in_R$ refers to randomly choosing a number from a set, and $Z^*_q$ is a prescribed multiplicative group of the integers modulo q, $g^{n_s}$ refers to computing $g^{n_s}$ mod p wherein g is a prescribed number in $Z^*_q$ with order q, and wherein p and q are large prime numbers such that q|p−1. The client computer receives ($ID_s$, $N_s$) (512), prompts the user to enter a user ID, $ID_u$, and password pwd (514), and then passes ($ID_s$, $ID_u$, $N_s$) to the mobile device (516). The mobile device receives ($ID_s$, $ID_u$, $N_s$) (518), chooses a random number $n_m \in_R Z^*_q$ (520), and computes $X_m = \epsilon_l(g^{n_m})$ (522), as well as $sk_{ms} = H(ID_u\|ID_s\|N_s\|X_m\|N_s^{n_m})$ (524) and $\theta = H(ID_u\|ID_s\|sk_{ms}\|0)$ (526). It then sends ($ID_s$, $X_m$, $\theta$) to the client computer (528). It is noted that $\epsilon_l(\cdot)$ is one of a pair of prescribed symmetric encryption algorithms with l as the secret key. $D_l(\cdot)$ is the other prescribed symmetric encryption algorithm of the pair also with l as the secret key. This latter algorithm will be employed shortly. It is also noted that the notation $H(\cdot\|\ldots\|\cdot)$ refers to a prescribed cryptographic hash function of a concatenation of the values contained within the brackets. Note that the value $N_s^{n_m}$ is equal to $g^{n_s \cdot n_m}$ and the value $N_m^{n_s}$, which will be introduced shortly, is also equal to $g^{n_s \cdot n_m}$.

The client computer receives ($ID_s$, $X_m$, $\theta$) from the mobile device (530), and computes $\phi = H(ID_u\|ID_s\|pwd\|\theta\|0)$ (532), and sends ($ID_u$, $X_m$, $\phi$) to the server via the secure channel (534). Upon receiving ($ID_u$, $X_m$, $\phi$) from the client computer (536), the server first computes $N_m = g^{n_m} = D_l(X_m)$ (538), $sk'_{ms} = H(ID_u\|ID_s\|N_s\|X_m\|N_m^{n_s})$ (540), and $\theta' = H(ID_u\|ID_s\|sk'_{ms}\|0)$ (542). The server then computes $\phi' = H(ID_u\|ID_s\|pwd\|\theta'\|0)$ (544) and checks it against the $\phi$ received from the client computer to see if it matches (546). If it does match, the server grants the user access rights to the Web site (548). Otherwise, access is not granted (550).

Figure 6A:
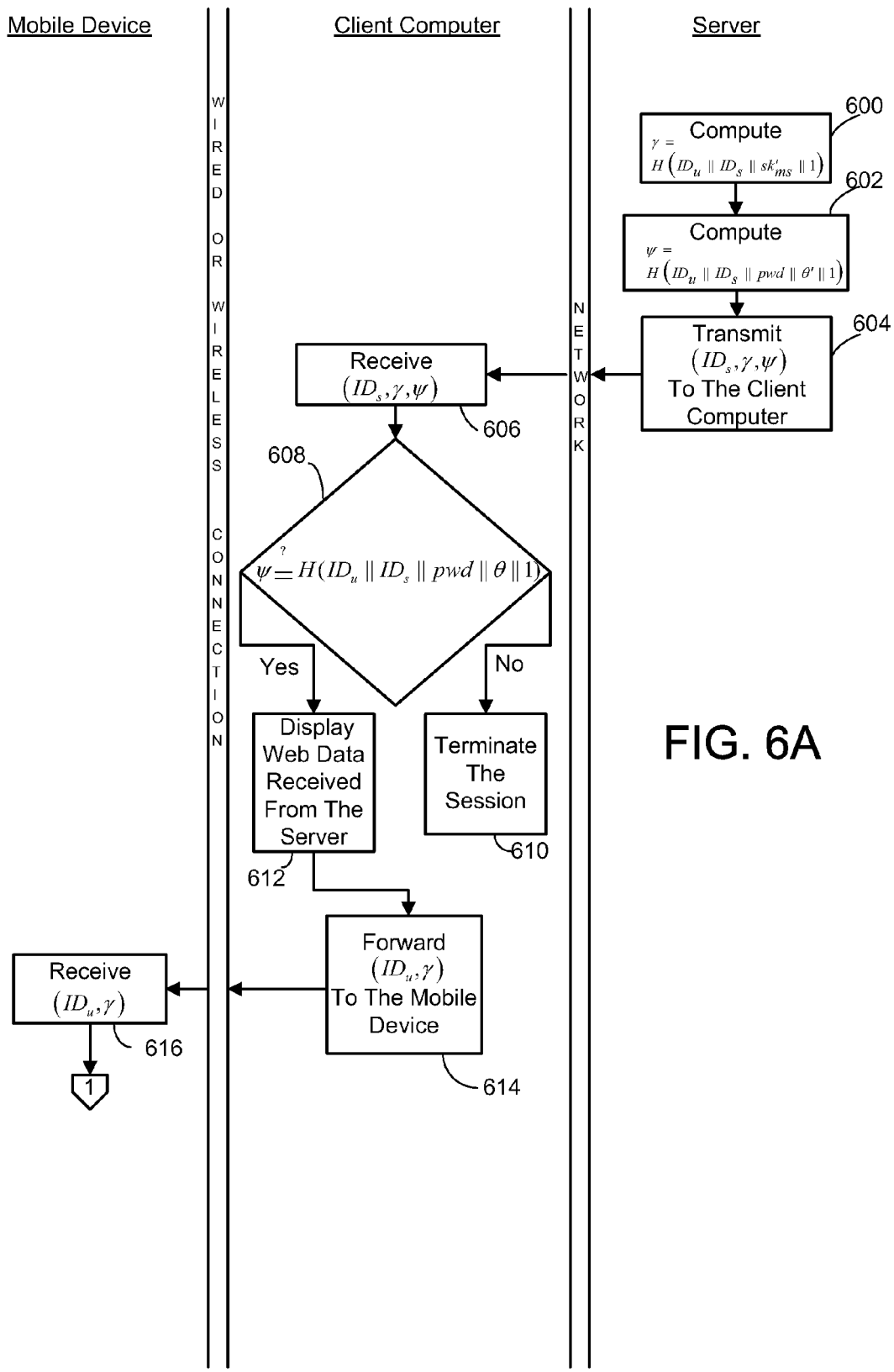
FIGS. 6A-B depict a continuing flow diagram outlining one variation of the server authentication process of FIGS. 4A-B.
Figure 6B:
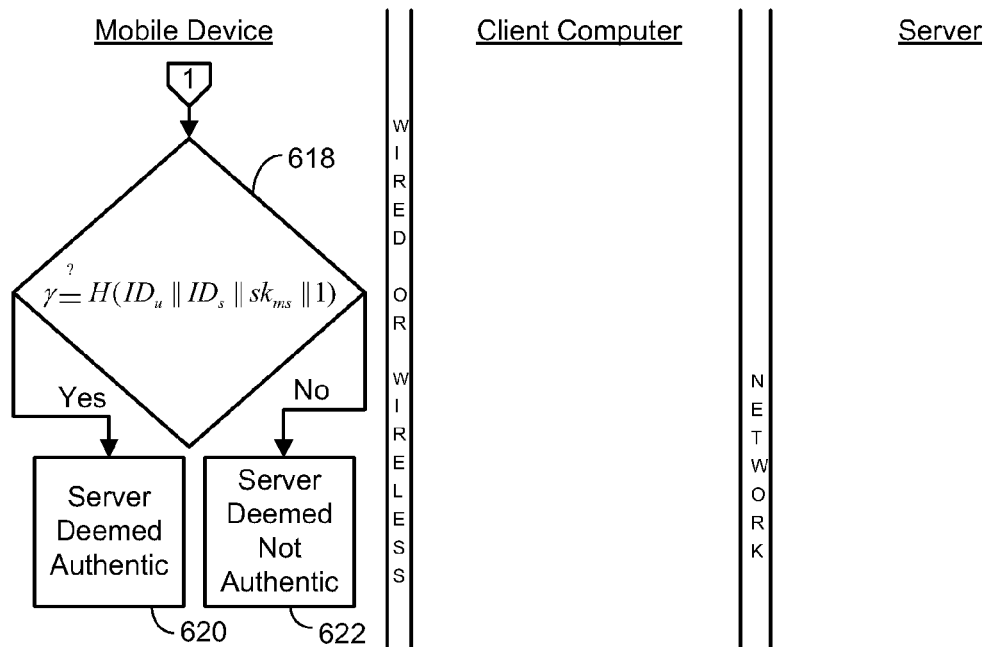

Referring now to FIGS. 6A-B, in an embodiment that includes server authentication, the server next computes $\gamma = H(ID_u\|ID_s\|sk'_{ms}\|1)$ (600), $\psi = H(ID_u\|ID_s\|pwd\|\theta'\|1)$ (602), and sends ($ID_s, \gamma, \psi$) to the client computer (604). As indicated previously, these values are used by the client computer and the mobile device to verify if the server knows the password pwd and the secret value l, as it would if it is authentically associated with the secure Web site the user wants to access. The client computer receives ($ID_s, \gamma, \psi$) from the server (606) and checks $\psi^? = H(ID_u\|ID_s\|pwd\|\theta\|1)$ (608), where the left side is the value received from the server and the right side is calculated by the client computer. If it does not match, the client computer terminates the session (610) since the server failed to show that it knows both the password pwd and the secret value l. It is noted that the foregoing client computer's authentication of the server was done without the mobile device being involved. However, if a match is found, the client computer displays Web data received from the server (612), and forwards ($ID_u, \gamma$) to the mobile device (614). The mobile device receives ($ID_u, \gamma$) from the client computer (616) and checks $\gamma^? = H(ID_u\|ID_s\|sk_{ms}\|1)$ (618), where the left side is received from the client computer (616) and the right side is calculated by the mobile device. If a match is found, the mobile device is sure that the server knows the secret value l and the server is deemed authentic (620). In this way, a secure channel has been established between the mobile device and the server, which can use $sk_{ms}$ as a session key. This secure channel can be used, if needed, to communicate high security data and interactions between the mobile device and the server via the client computer without the client computer's knowledge of the content. On the other hand, if a match is not found, the server is deemed not to be authentic and no secure channel is set-up (622).

1.4 Authentication Without Forward Security

In some embodiments, forward security may not be necessary. If that is the case, a simpler process can be implemented in which the mobile device does not calculate exponentials, which can be quite complex. The following is a process directed at one implementation of the above-described user and server authentication, which does not satisfy the requirements of forward security. In this implementation please note that the notations $N_s$ and $X_m$ have been redefined as the random numbers selected by the server and the mobile phone, respectively. They correspond to $n_s$ and $n_m$, respectively, in the authentication with forward security described in the last section.

Figure 7A:
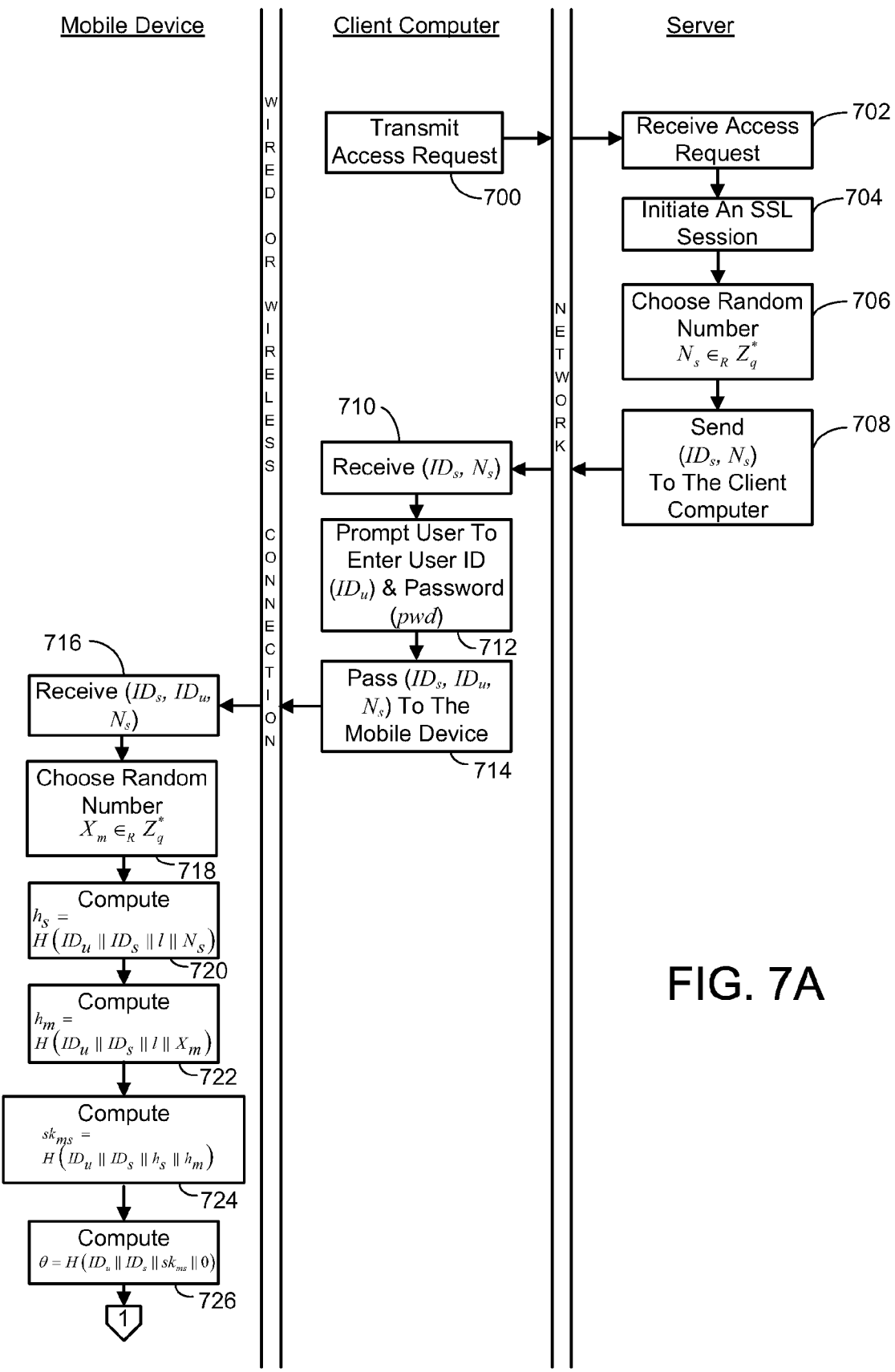
FIGS. 7A-B depict a continuing flow diagram outlining one variation of the user authentication process of FIGS. 3A-C, without forward security.
Figure 7B:
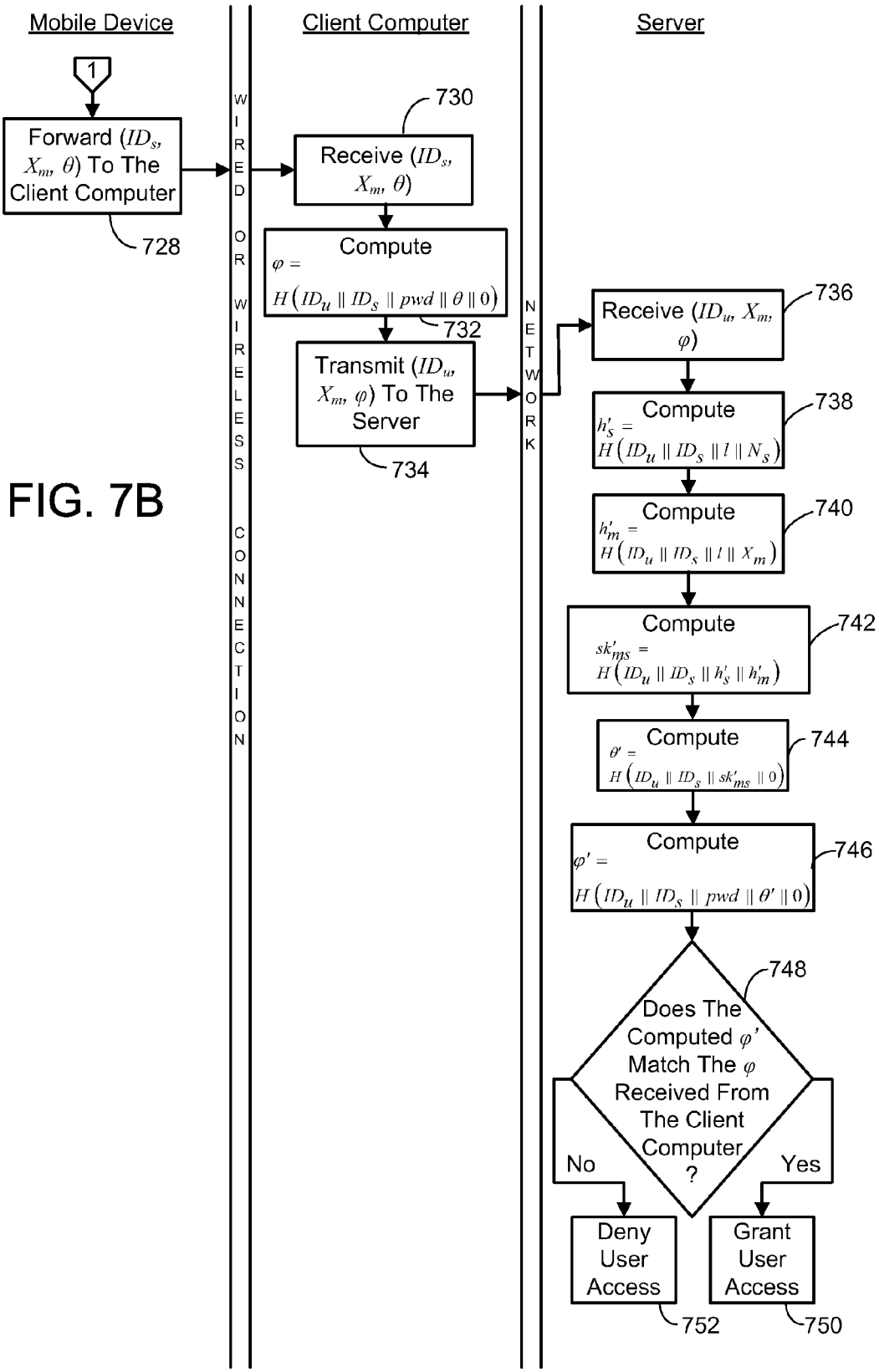

Referring to FIGS. 7A-B, the process begins with the client computer sending an access request to the server associated with the Web site that a user wants to access (700). The server receives the request (702) and establishes a SSL session between the server and the client computer to create a secure channel that all subsequent communications between them will use (704). The server then chooses a random number $N_s$ $\in_R Z^*_q$ (706) and sends it to the client computer with its identity $ID_s$ through the secure channel (708). The client computer receives ($ID_s$, $N_s$) from the server (710) and prompts the user to enter a user ID, $ID_u$, and password pwd (712), and then passes ($ID_s$, $ID_u$, $N_s$) to the mobile device (714). The mobile device receives ($ID_s$, $ID_u$, $N_s$) (716), chooses a random number $X_m \in_R Z^*_q$ (718), and computes $h_s=H(ID_u\|ID_s\|1\|N_s)$ (720), $h_m=H(ID_u\|ID_s\|1\|X_m)$ (722), $sk_{ms}=H(ID_u\|ID_s\|h_s\|h_m)$ (724) and $\theta=H(ID_u\|ID_s\|sk_{ms}\|0)$ (726). It then sends ($ID_s$, $X_m$, $\theta$) to the client computer (728). After receiving ($ID_s$, $X_m$, $\theta$) from the mobile device (730), the client computer computes $\phi=H(ID_u\|ID_s\|pwd\|\theta\|0)$ (732), and sends ($ID_u$, $X_m$, $\phi$) to the server via the secure channel (734). Upon receiving ($ID_u$, $X_m$, $\phi$) from the client computer (736), the server computes $h'_s=H(ID_u\|ID_s\|1\|N_s)$ (738), $h'_m=H(ID_u\|ID_s\|1\|X_m)$ (740), $sk'_{ms}=H(ID_u\|ID_s\|h'_s\|h'_m)$ (742) and $\theta'=H(ID_u\|ID_s\|sk'_{ms}\|0)$ (744). The server then computes $\phi'=H(ID_u\|ID_s\|pwd\|\theta'\|0)$ (746) and checks it against the $\phi$ received from the client computer to see if it matches (748). If it does match, the server grants the user access rights to the Web site (750). Otherwise, access is not granted (752).

In an embodiment that includes server authentication, the process is identical to that described in connection with FIG. 6, except that the values of $sk_{ms}$, $sk'_{ms}$, $\theta$ and $\theta'$ are those computed in the present section rather than the previous section.

1.5 Protection of High Security Data and Interactions

Another mobile device assisted secure computer network communications embodiment involves using the mobile device to establish a secure channel with the server for the transfer of high security data, such as bank account numbers, credit card numbers, social security number, and so on. This secure channel can also be used for secure interactions with the accessed Web site. For example, this can include accessing emails, selling stocks through an online Web broker account, or performing online banking. This is particularly useful when the client computer is untrusted. With this implementation, data transfers and interactions with the server are classified into two security levels—high and low. Data and interactions assigned a high security level are tunneled to the mobile device to display and interact with the user so that only the user can see the sensitive data and execute critical interactions. Data and interactions assigned a low security level are displayed on and interacted with through the client computer in a normal manner. Thus, the user's critical data and interactions can be protected. For example, when using an untrusted client computer, sensitive data might be left over in the computers storage, or recorded by a malicious program running on the computer. Of course, a user can use his or her mobile device for all interactions with the secure Web site. However, a mobile device's user interface is typically awkward and very inefficient for complex viewing or interactions. With the foregoing implementation, the user can employ the superior interfaces of a client computer (e.g., bigger display, full-sized keyboard, and so on) for viewing low security data and performing low security interactions with the Web site. Only the high security data and interactions would be handled through the mobile device.

Figure 8A:
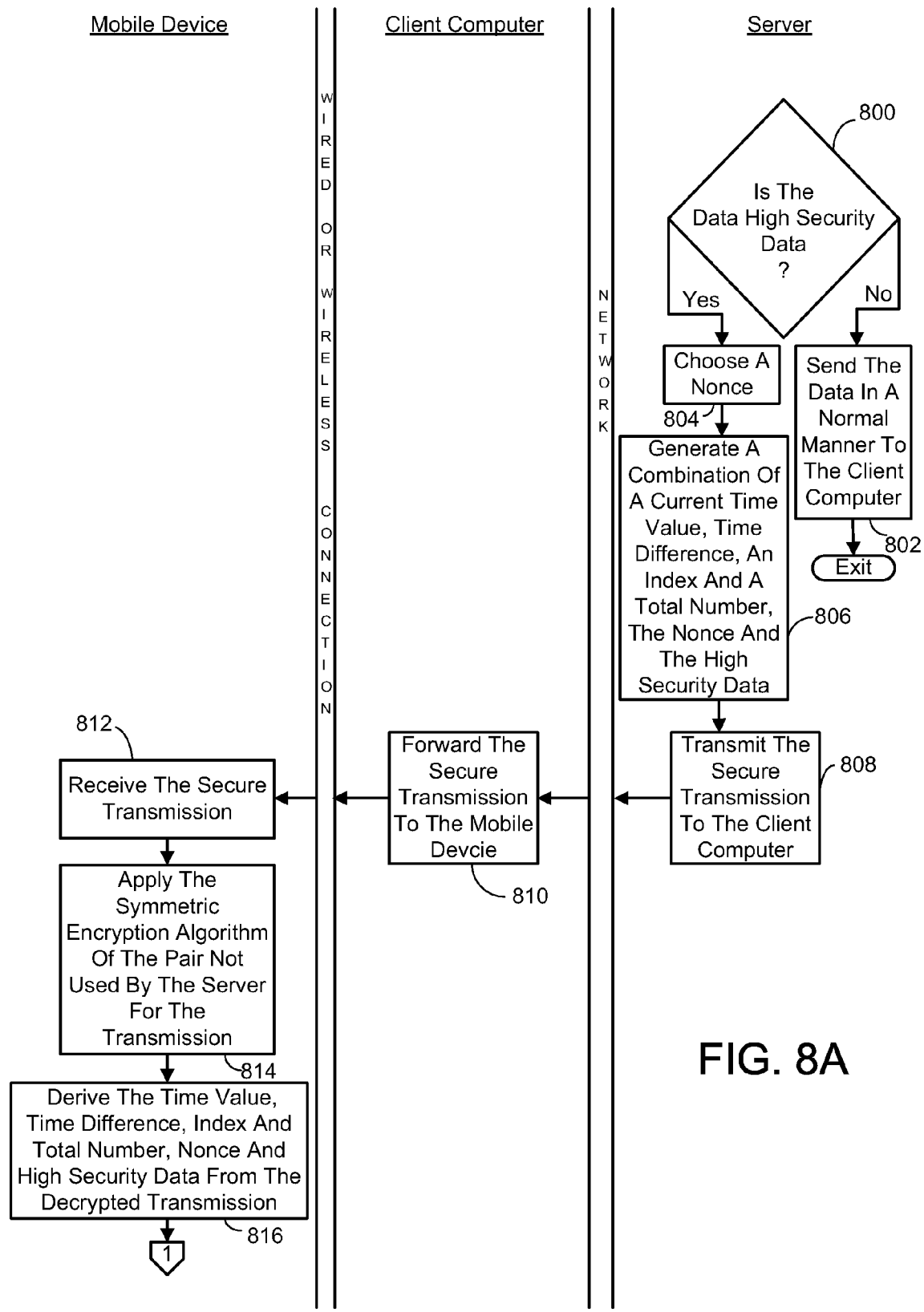
FIGS. 8A-C depict a continuing flow diagram generally outlining an implementation of a process for using a secure channel between the mobile device and the server to transfer of high security data.
Figure 8B:
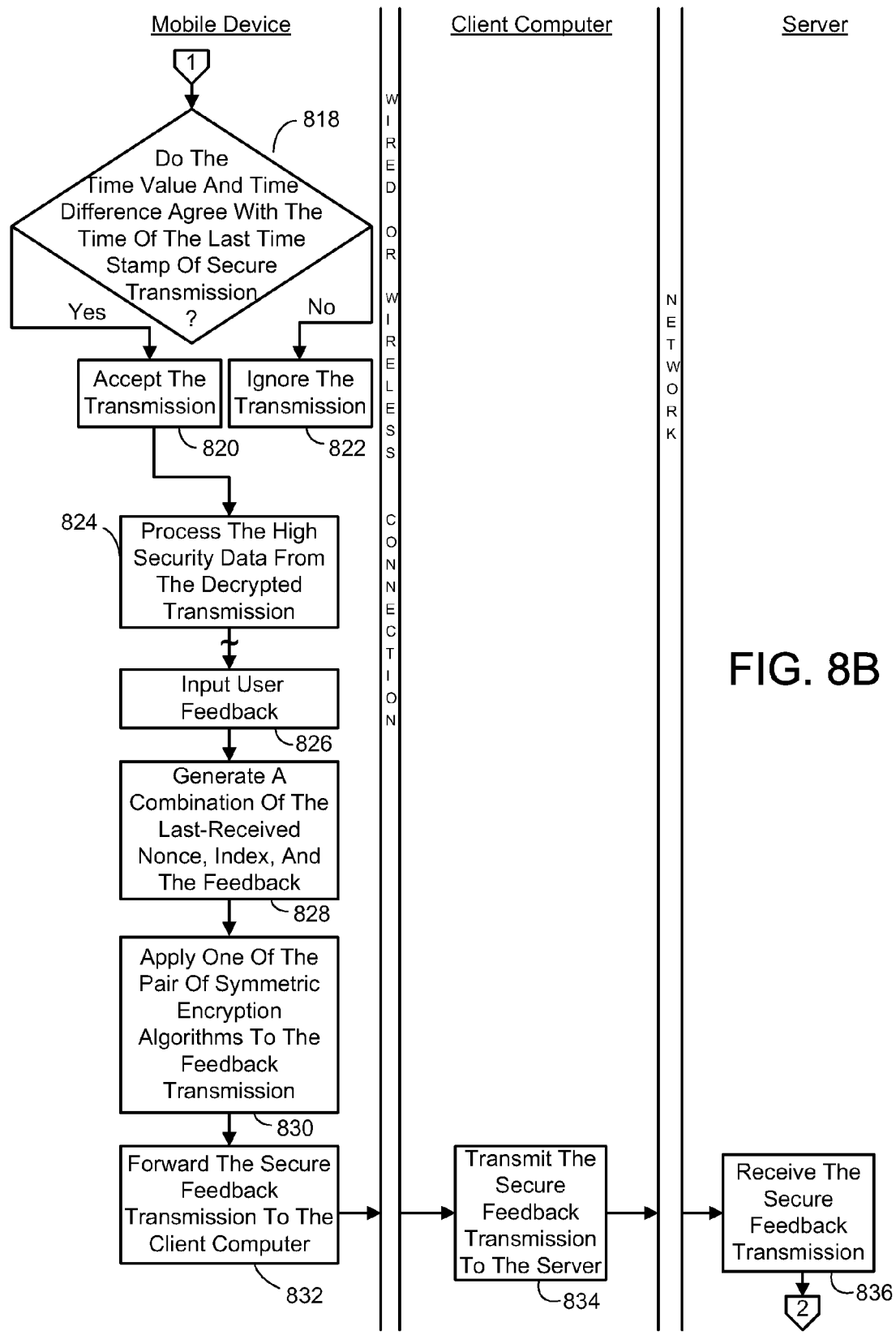
Figure 8C:
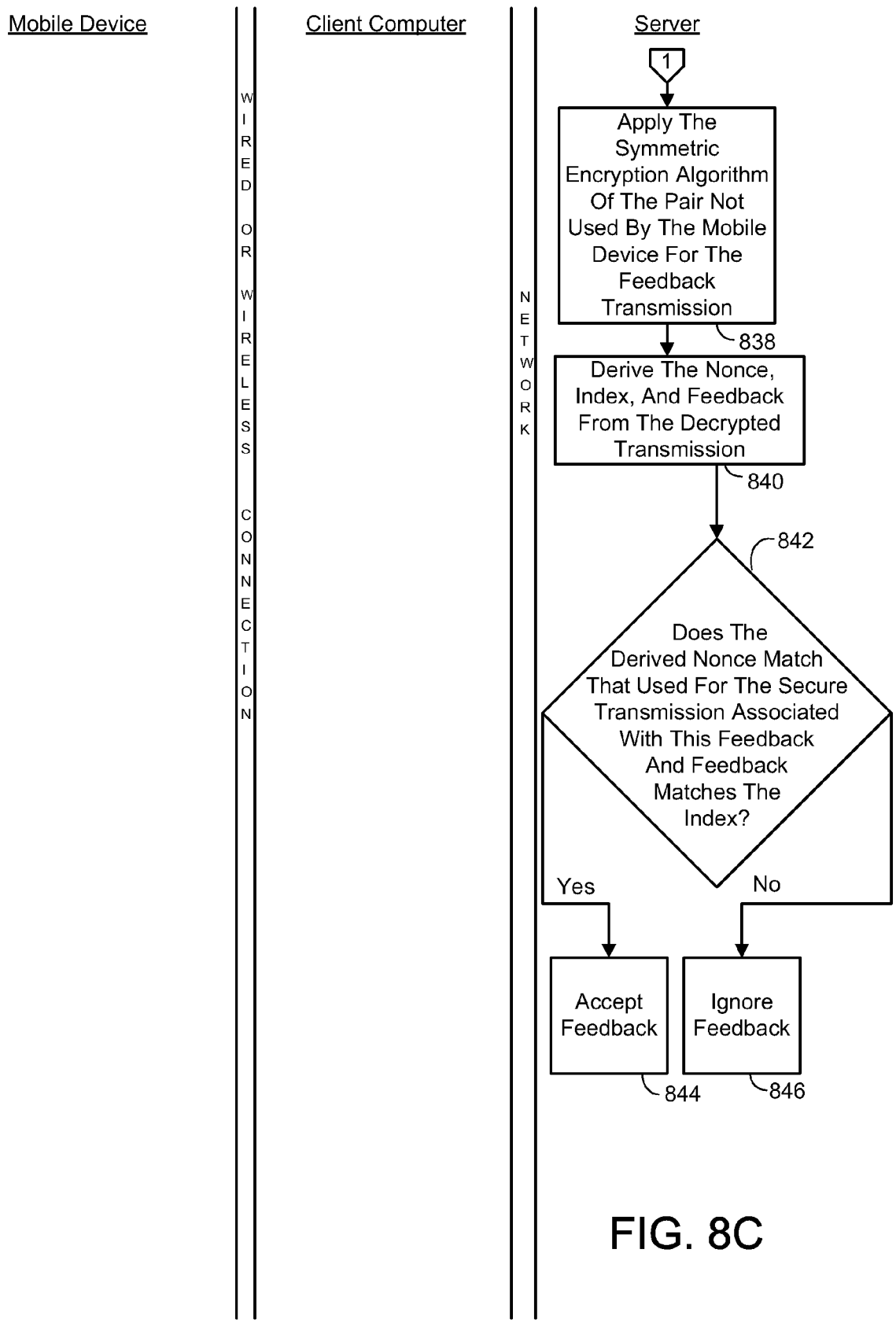

An exemplary process implementing the foregoing is shown in FIGS. 8A-C. The process begins once the user and server have been mutually authenticated as described previously, and involves the transfer of high security data and/or instructions from the server to the mobile device, and the transfer of feedback from the mobile device to the server. The reverse process of transferring high security data and/or instructions from the mobile device to the server, which will not be described herein, can be accomplished in the same way by simply switching the roles. First, the server determines if data it is going to send to the user has been previously identified as high security data (800). It is noted that in general, the server decides what data or interactions require higher security for the associated secure Web site. This can be done by applying a set of prescribed rules. On one hand, the more data and interactions classified into a higher security level, the more secure. On the other hand, the less data and interactions classified into a higher security level, the more convenient to a user since a client computer typically has a much larger display and full-sized keyboard as well as much better computing resources. The two conflicting requirements should be carefully balanced. There is always a need to trade off between security and convenience. If it is determined the data being sent to the user is not high security data, it is sent in the normal manner to the client computer (802). However, if the data being sent to the user is high security data, the server chooses a nonce $n_s$ (804). The nonce can be any one-time use marker. The server next generates a combination of the high security data being transmitted W, nonce $n_s$, and at least one security value (806). The potential security values include:

a) a current time stamp T assigned to the high security data;

b) a time difference $\Delta T$ representing the period between the current time stamp and the time stamp associated with the last-sent high security data prior to the current transfer having a different time stamp; and c) in cases where the high security data assigned the current time stamp cannot be sent in one transmission and so is sent in multiple transmission, an index i representing the sequence number of the transmission among the total number of transmissions c employed to transfer the high security data associated with the current time stamp.

In one embodiment, the aforementioned combination is generated by computing a concatenation of the included items. One of a pair of prescribed symmetric encryption algorithms with the previously computed session key $sk_{ms}$ as the secret key (e.g., $\epsilon_{sk_{ms}}(\cdot)$) is then applied to the concatenation to produce a secure transmission $T_s$. For example, if all the aforementioned security values are employed, $T_s=\epsilon_{sk_{ms}}(W\|n_s\|T\|\Delta T\|i\|c)$. It is noted that the session key $sk_{ms}$ is known only to server and the mobile phone, and so provides a secure key to use with the encryption algorithms. The server then transmits the secure transmission to the client computer (808), which forwards it to the mobile device (810). The mobile phone receives the secure transmission from the server via the client computer (812), and applies the one of the pair of prescribed symmetric encryption algorithms, which was not employed by the server to encrypt the high security data combination, to the transmission (814) (e.g., $D_{sk_{ms}}(\cdot)$). The session key $sk_{ms}$ is again used as the secret key for the encryption algorithm. The mobile phone then derives the high security data, nonce, and included security value or values from the decrypted transmission (816) (e.g., by de-concatenating the combined data). Assuming for the purposes of this exemplary process that the time stamp and the time difference are included in the aforementioned combination, these values can be checked against the time stamp of the last-received transmission having a different time stamp (818). If the current time stamp less the time difference corresponds to the time stamp of the last-received transmission having a different time stamp, the transmission is accepted (820). If not, the transmission is ignored (822) and the process ends. This, the time stamp can be used to prevent replay attacks where an old encrypted message is captured by a malicious computer and resent to the mobile device. Resistance to replay attacks is particularly advantageous when dealing with time-varying data, such as the current market value of a stock. If the current secure transmission is accepted, the mobile device processes the high security data from the decrypted transmission in a normal manner, which may entail displaying it on the mobile device's display screen (824). It is noted that in cases where the time difference is included in the aforementioned combination, it can also be used to check if there was any drop of a high security transmission. In cases where the index and total number of transmissions employed to transfer the high security data associated with the current time stamp are included in the aforementioned combination, it is possible to check whether there is a missing block of the high security data.

Assuming that the user enters feedback into the mobile device that is to be sent to the server in response to the received high security data, the mobile device inputs the feedback (826), and then generates a combination of the feedback, last-received nonce, and in the case where multiple transmission have the same time stamp, the index of the high security data associated with the user feedback (828). Here again this can entail computing a concatenation of these items. The mobile device then applies one of the pair of prescribed symmetric encryption algorithms having the session key as its secret key, to the generated combination, to produce a secure feedback transmission (830). For example, the mobile device can concatenate the feedback F, nonce $n_s$ and index i, and then apply the symmetric encryption algorithm ($\epsilon_{sk_{ms}}(\cdot)$) to produce the secure feedback transmission $T_m = \epsilon_{sk_{ms}}(F\|n_s\|i)$. The mobile device then forwards the secure feedback transmission to the client computer (832), which transmits it to the server (834). The server receives the secure feedback transmission from the client computer (836), and applies the one of the pair of prescribed symmetric encryption algorithms, which was not employed by the mobile device to encrypt the feedback, to the transmission (838) (e.g., $D_{sk_{ms}}(\cdot)$). The session key $sk_{ms}$ is again used as the secret key for the encryption algorithm. The server next derives the feedback, nonce, and potentially the index from the decrypted combination (840) (e.g., by de-concatenating the combined data). It is then determined if the derived nonce, and if included the index, matches to the nonce (and index) used in the producing the secure transmission associated with the feedback (842). If the nonces match (and if applicable the user feedback is associated with the correct index), the feedback is accepted (844). If not, the feedback is ignored (846). In the feedback case, it is the nonce matching that is used to prevent replay attacks. This can be important for some operations such as transferring money.

It is noted that the foregoing process can be modified for use when no feedback is expected from the mobile device. In such a case, the process would end with action 824.

1.6 Client Computer Clean-Up

Another mobile device assisted secure computer network communications embodiment involves deleting cookies, temporary files, and cached data from an untrusted client computer (or if the user chooses to do so even on a trusted computer). In general, when a session with a secure Web site is ended, or optionally when it is determined that the user's mobile device is no longer in communication with the client computer, the client computer deletes the cookies, temporary files, and cached data associated with the session. This has the advantage of preventing a subsequent user of the client computer from reading or accessing the data from secure Web sites even if the previous user forgot to clean up before leaving. As such this embodiment is very useful when a user uses a public or otherwise untrusted client computer. The plug-in needed to implement this embodiment can be downloaded from the server to the client computer when access to the secure Web site is granted.

Figure 9A:
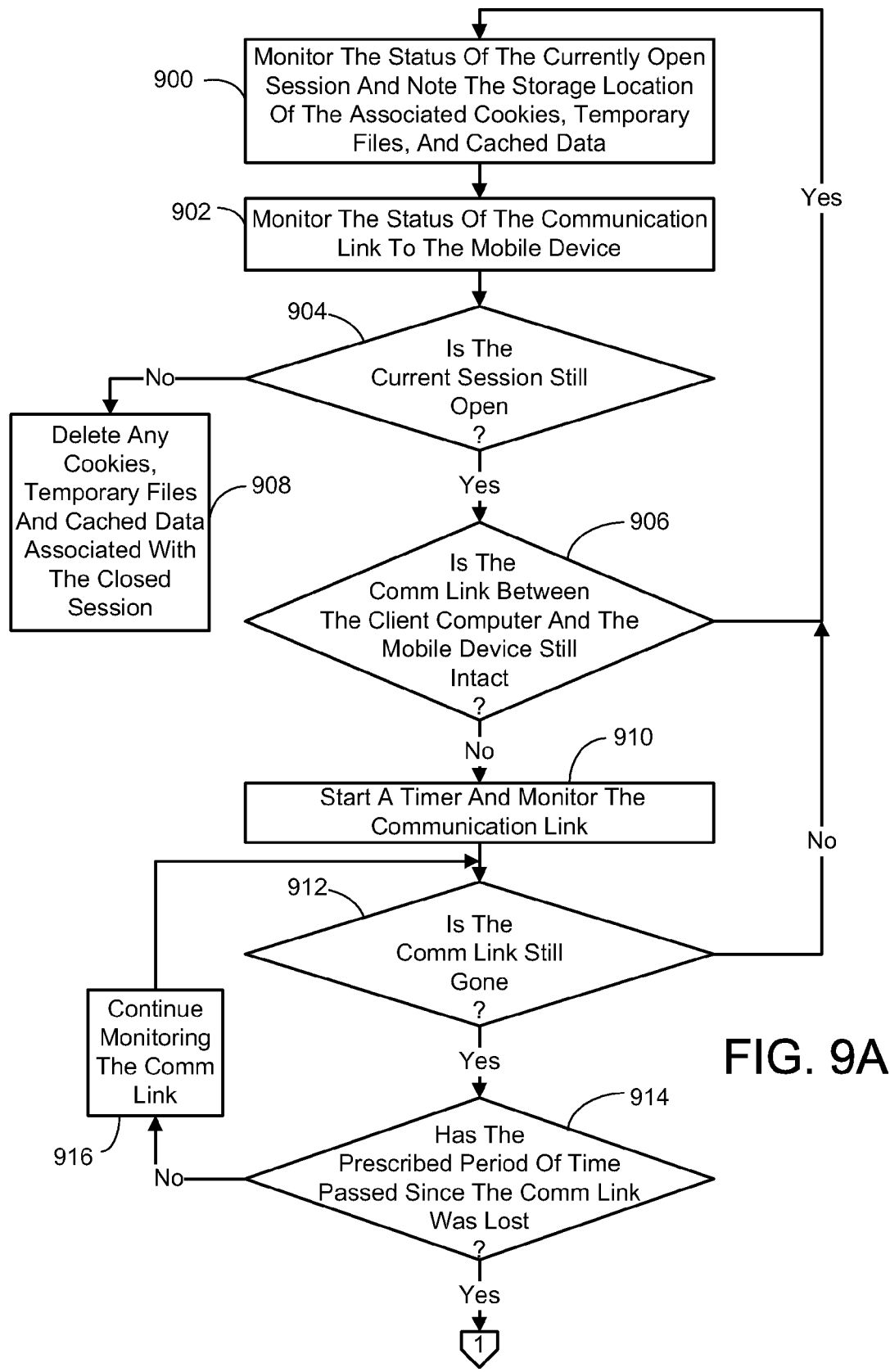
FIGS. 9A-B depict a continuing flow diagram outlining an implementation of a process for monitoring the client computer and deleting cookies, temporary files, and cached data when a session with a secure Web site is ended, or when it is determined that the user's mobile device is no longer in communication with the client computer.
Figure 9B:
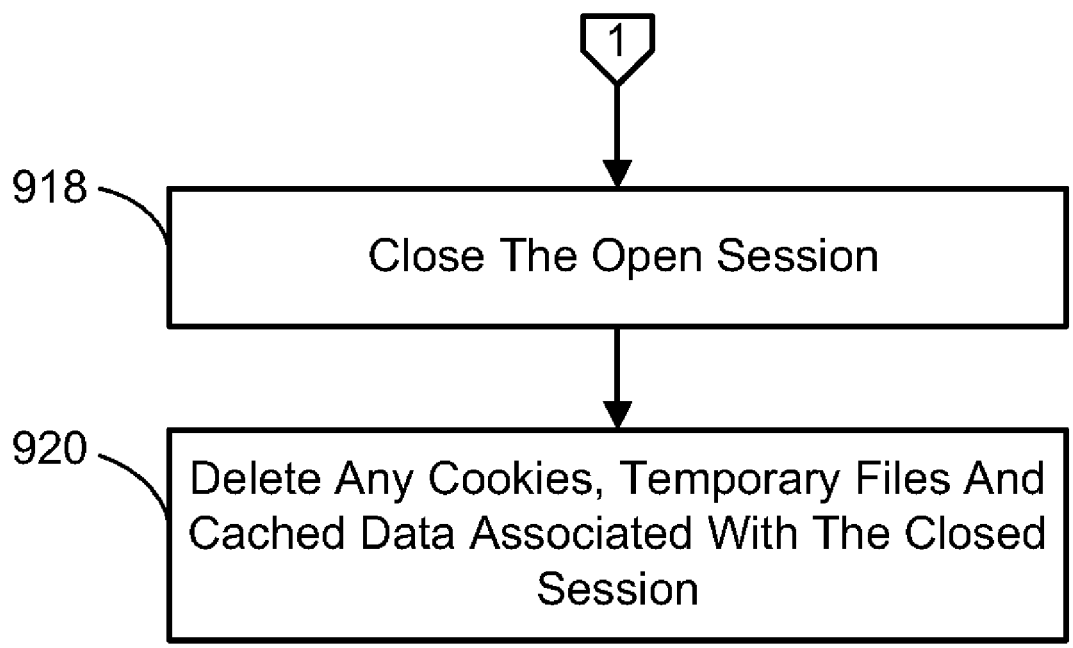

An exemplary process implementing the foregoing is shown in FIGS. 9A-B. The process begins with the client computer monitoring the status of the currently open session and noting the location of the associated cookies, temporary files, and cached data that are stored in the client computer (900). In addition, the client computer monitors the status of its communication link to the user's mobile device (902). It is periodically determined if the current session is still open (904). If so, it is determined if the communication link between the client computer and the mobile device is still intact (906). If the current session is still open and the communication link intact, then no action is taken and the monitoring continues. However, if it is determined that the current session is closed, the client computer deletes any cookies, temporary files and cached data associated with the closed session (908). If it is determined that the current session is still open, but the communication link between the client computer and the mobile device has been lost since last checked, then the client computer starts a timer and monitors the communication link (910). It is periodically determined if the link is still gone (912). If the link reappears, no action is taken, and the regular monitoring resumes. If the link is still gone, it is determined if a prescribed period of time (e.g., 5 minutes) has passed since it was lost (914). If not, the monitoring continues (916). If, however, the prescribed period of time has passed, then it is assumed that the user is gone and the client computer closes the open session (918), and deletes any cookies, temporary files and cached data associated with the closed session (920).

2.0 Attack Resistance

The mobile device assisted secure computer network communications embodiments described herein have many advantages including resistance to many types of attacks. The following are a few examples.

2.1 Remote Desktop Attacks

A malicious browser can forward the data from the server to another computer controlled by another user. However, the other user can see only the non-high security data that the malicious browser can already access. High security data and operations are protected from the malicious browser by the secure channel $\epsilon_{sk_{ms}}(\cdot)$, where $sk_{ms}$ is only known to the mobile phone and the server.

2.2 Session Hijacking Attacks

In a session hijacking attack, an unauthorized user takes full control of the client computer being used by the user, and may modify the user's operations or perform unauthorized operations. For the same reason as mentioned in Section 2.1, a hijack attack cannot gain anything more than the non-high security data a malicious browser can already access.

2.3 Parallel Session Attacks

In this attack, two or more protocol instances are running simultaneously. Messages from one protocol instance are used to form messages in other protocols. This attack will not succeed since during user authentication, freshness is used and checked by all the parties involved. After authentication, the connections between the mobile device and the server, and between the client computer and the server are secure. Additional protection is provided by these embodiments that do mutual authentication between the mobile device and the server, and between the client computer and the server.

2.4 Man in the Middle Attacks

This type of attack is ruled out by embodiments performing the mutual authentications between the mobile device and the server, and between the client computer and the server, and by the secure channels between the mobile device and the server.

2.5 Keylogger With Adjacency Attacks

A keylogger installed in the client computer being used by the user can capture the password input. This captured password alone does not allow another user to impersonate the victim to log into the secure Web site since this also requires the secret value from the mobile device in user authentication. One possible attack is that another computer within the range of a wireless network that the mobile device is using to connect to the client computer colludes with the keylogger to impersonate the user to log into the secure Web site without the user's notice. However, this would be impossible in those embodiments where a user's pressing of a button on the mobile device is needed before the device is involved in a user authentication.

2.6 Mobile Malicious Software

The mobile device assisted secure computer network communications embodiments described herein do not require the mobile device to be trusted, as there is no secret stored in the mobile device. The secret value that the mobile device uses in user authentication is generated in real time, and is bound to the mobile device's hardware (and possibly a SIM card). To deduce this secret value, an adversary has to know the method and parameters in generating it and run a malicious software program that mimics these functions on the victim's mobile device. However, since the program installed on a mobile device is individualized (i.e., a different $R_m$ is used for each device), different mobile devices generate the secret value differently. Successful reverse engineering on one mobile device's program does not enable an adversary to run the same program on another mobile device to generate the secret value and thus the login credentials correctly, due to different values of $R_m$ contained in the programs installed on different mobile devices. The adversary has to compromise the software installed on a specific mobile device to deduce the secret value generated by that device. Thus, any malicious software installed on a mobile device is resisted as long as the program installed on the mobile device is not reversed-engineered or modified, the calls to system functions are secure, and the interaction between the program and the mobile device user is not modified or forged. This is a more realistic assumption than a trusted mobile device.

2.7 Secret Value Disclosure

If the secret value in a mobile device is compromised, security is lowered to the same level as a conventional system that relies on a password. If this occurs, a user should run the setup procedure to renew the secret value as soon as possible. This is the same as when the mobile device is lost. Note that even if both the password and the mobile device's secret value are compromised, the previous communications are still secure since the user authentication satisfies forward security (assuming the forward security implementation is employed).

2.8 Common Password Attacks

Users often use the same password for different Web sites, which may make the common password attack successful. In such an attack, an adversary may break into a low-security Web site to retrieve userid/password pairs, and then uses them for other Web sites. However, the mobile device assisted secure computer network communications embodiments described herein result in different Web sites having different login credentials even when a user chooses the same password for all his or her Web accounts since the credentials used in the authentication depend on the ID (e.g., URL) of a secure Web site as well as the hardware of the mobile device (and/or SIM card). This feature renders common password attacks useless.

2.9 Social Engineering

An adversary can use social engineering techniques, such as phishing, to masquerade as a trustworthy person or business, and fraudulently asks the user to divulge the password. This type of attack is not effective here since authentication credentials generated from the mobile device are needed for the user authentication. An adversary has to obtain the password and possess the mobile device simultaneously to log into the secure Web site.

2.10 Oracle Attacks

Adversaries may launch oracle attacks by initiating many login requests to try to obtain useful information about the mobile device's secrets. But since the encryption algorithms used here are resistant to ciphertext attacks, and the hash function used in some embodiments is collision free, oracle attacks are ineffective.

3.0 The Computing Environment

Figure 10:
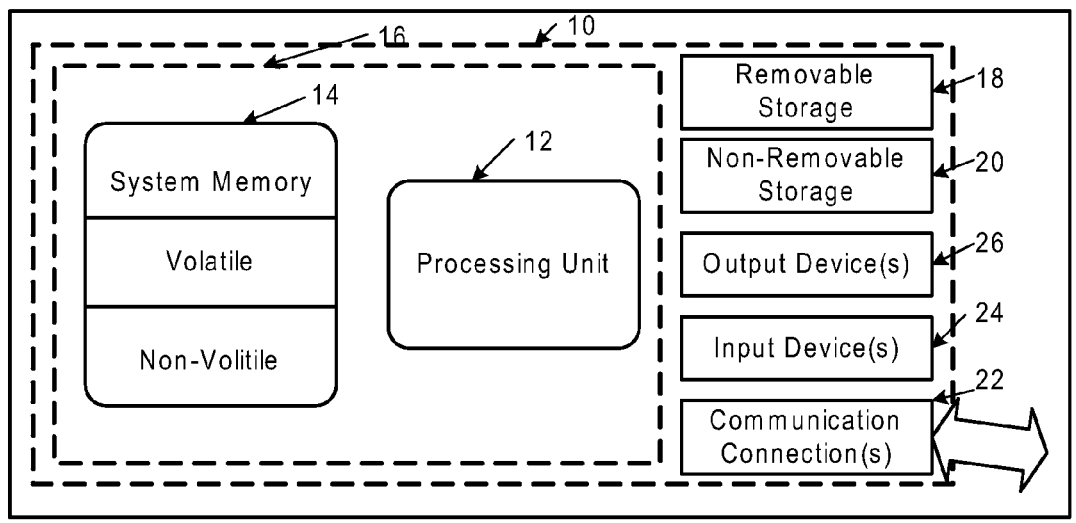
FIG. 10 is a diagram depicting a general purpose computing device constituting an exemplary system for implementing mobile device assisted secure computer network communications embodiments described herein.

A brief, general description of a suitable computing environment in which portions of the mobile device assisted secure computer network communications embodiments described herein may be implemented will now be described. The embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. FIG. 10 illustrates an example of a suitable computing system environment. The computing system environment is only one example of a suitable computing environment and is not intended to suggest any limitation as to the scope of use or functionality of mobile device assisted secure computer network communications embodiments described herein. Neither should the computing environment be interpreted as having any dependency or requirement relating to any one or combination of components illustrated in the exemplary operating environment. With reference to FIG. 10, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 10 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 10 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10. Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here. The mobile device assisted secure computer network communications embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

4.0 Other Embodiments

It is noted that in the foregoing description, the mobile device assisted secure computer network communications embodiments do not require the mobile device to store anything. As a variant, a mobile device can store a list that includes all the secure Web sites that the mobile device shares secret values with. When receiving a user authentication request from a server associated with a secure Web site, the mobile device checks against the stored list. If the Web site is in the list, the authentication process proceeds. Otherwise the mobile device rejects the request and displays the rejection on its screen. Another variant is to store a seed in the mobile device for each secure Web site in the stored list of Web sites. This seed is used in generating the secret value along with the $R_m$, the unique values from the mobile device's hardware (and possible its SIM card), and the Web site's ID. This variation has the advantage that each Web site's secret value can be updated individually, which is achieved by simply updating the seed of that Web site. The stored list of Web sites and the seeds can be backed up somewhere else. There is no need to protect them from being disclosed.

It is also noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. In a system comprising a server which is in communication with a client computer over a computer network, and a user's mobile device which is in communication with the client computer, a process for conducting communications over the computer network, the process comprising using said client computer to perform the following process actions:

facilitating an authentication by the server of the user who is attempting to access a network site associated with the server, wherein said facilitation comprises, receiving a secret value representation comprising a secret value from the mobile device, wherein the mobile device generates the secret value representation whenever needed, and wherein the server knows the secret value, and wherein said secret value is a combination comprising a hidden number stored by the mobile device, a site identification which is unique to the network site the user is attempting to access, and a mobile device identification number, combining the secret value representation and a password which is entered into the client computer by the user and known to the server, to produce a combined representation, transmitting the combined representation to the server for use in determining if the password and secret value known to the server were used to generate the combined representation, and receiving a notice from the server as to whether access to said network site has been granted or not, wherein access is granted only if the password and secret value known to the server were used to generate the combined representation; and informing the user as to whether access to said network site has been granted or not.

2. The process of claim 1, wherein the process action of receiving a representation of a secret value from the mobile device, comprises the actions of:

receiving from the server, a server identification and a server challenge number generated by the server;

prompting the user to enter a user identification and password via a user interface of the client computer, wherein the password is known by the server;

inputting said user identification and password, and forwarding the server identification, user identification and server challenge number to the mobile device; and receiving from the mobile device, a mobile device challenge number which was generated by the mobile device and said secret value representation.

3. The process of claim 2, wherein the process action of transmitting the combined representation to the server, further comprises an action of transmitting the user identification and the mobile device challenge number along with the combined representation.

4. The process of claim 1, further comprising, whenever a notice is received from the server granting access to the network site, the process actions of:

receiving from the server, a server authentication value for the client computer comprising a combination of the password and a server-generated version of the secret value representation;

determining if the password input by the user and the secret value representation passed from the mobile device were used by the server in generating the server authentication value;

only allowing the user to access said network site if the password input by the user and the secret value representation passed from the mobile device were used by the server in generating the server authentication value; and whenever the passwords match and the secret value representations match, forwarding the server-generated version of the secret value representation to the mobile device.

5. The process of claim 1, further comprising the actions of:

monitoring the status of a communication session between the client computer and the server, and noting the storage location of cookies, temporary files and cached data associated with the session;

monitoring the communication link between the client computer and the mobile device;

whenever it is found that the session between the client computer and the server has been closed, deleting any cookies, temporary files and cached data associated with the closed session;

whenever it is found that the session between the client computer and the server is still open, but that the communication link between the client computer and the mobile device is lost for more than a prescribed period of time, closing the session between the client computer and the server, and deleting any cookies, temporary files and cached data associated with the closed session.

6. In a system comprising a server which is in communication with a client computer over a computer network, and a mobile device which is in the possession of a user of the client computer and which is in communication with the client computer, a process for conducting communications over the computer network, the process comprising using said mobile device to perform the following process actions:

facilitating an authentication by the server of the user who is attempting to access a network site associated with the server, wherein said facilitation comprises, generating a secret value representation comprising a secret value, wherein the mobile device generates the secret value representation whenever needed, and wherein the server knows the secret value, and wherein said secret value is a combination comprising a hidden number stored by the mobile device, a site identification which is unique to the network site the user is attempting to access, and a mobile device identification number, forwarding the secret value representation to the client computer for use in combining the secret value representation and a password which is entered into the client computer by the user and known to the server, to produce a combined representation, which is then transmitted to the server for use in determining if the password and secret value known to the server were used to generate the combined representation.

7. The process of claim 6, wherein the process action of generating the secret value representation, comprises the actions of:

receiving from the server via the client computer a server identification and server challenge number;

generating the secret value;

generating a mobile device challenge number using the secret value;

generating a session key comprising a combination of a user identification, the server identification, the server challenge number, the mobile device challenge number, and a verification value created from the server challenge number and a number generated by the mobile device; and generating the secret value representation as a combination comprising the session key and the user and server identifications.

8. The process of claim 7, wherein the process action of generating the secret value, comprises the action of:

retrieving a said hidden number stored by the mobile device, wherein the hidden number is unique to the mobile device; and generating the secret value as a combination of the hidden number, said site identification which is unique to the network site the user is attempting to access, and the mobile device identification number, such that the secret value is unique to the mobile device and the network site the user is attempting to access.

9. The process of claim 7, wherein the process action of generating the mobile device challenge number using the secret value, comprises the actions of:

randomly choosing a number $n_m$ from prescribed set of numbers $Z_q^*$;

computing $g^{n_m}$ mod p wherein g is a prescribed number in $Z_q^*$ with order q, and wherein p and q are large prime numbers such that $q|p-1$;

computing $\epsilon_l(g^{n_m})$ wherein $\epsilon_l(\bullet)$ is one of a pair of prescribed symmetric encryption algorithms with l as the secret key, and wherein l is the secret value; and designating the result of the $\epsilon_l(e^{n_m})$ computation as the mobile device challenge number; and wherein the verification value is computed as the server challenge number raised to the $n_m$ power modulo p.

10. The process of claim 7, further comprising, whenever the server has granted access to the network site, the process actions of:

receiving from the server via the client computer, a server authentication value for the mobile device comprising a combination of the user identification, the server identification and a server-generated version of the session key;

deriving a mobile device-generated version of the session key;

ensuring that the mobile device-generated session key matches the server-generated version of the session key used in generating the server authentication value; and only allowing communication of prescribed high security data between the server and the mobile device via the client computer if the mobile device-generated session key matches the server-generated version of the session key.

11. The process of claim 10, wherein the process action of only allowing communication of prescribed high security data between the server and the mobile device via the client computer if the mobile device-generated session key matches the server-generated version of the session key, further comprises the actions of:

receiving high security data from the server via the client computer which is encrypted using a security protocol employing the previously generated session key, said receiving comprising, inputting the server-encrypted high security data, and decrypting the high security data, which has been encrypted by the server via said security protocol comprising generating a combination of a time value, a nonce chosen by the server and the high security data, and applying one of a pair of prescribed symmetric encryption algorithms having the session key as its secret key, to the generated combination, to produce the server-encrypted high security data, wherein the decrypting comprises, applying the one of said pair of prescribed symmetric encryption algorithms, which was not employed by the server to encrypt the high security data, to the inputted server-encrypted high security data, and deriving the time value, nonce and high security data from the decrypted combination; and transmitting secure feedback to the server in response to the previously received high security data, said transmitting comprising, generating a combination of the previously received nonce and the feedback it is desired to send to the server, applying one of said pair of prescribed symmetric encryption algorithms having the session key as its secret key, to the generated combination, to produce the secure feedback, and transmitting the secure feedback to the server via the client computer.

12. The process of claim 6, wherein the process action of generating the secret value representation, comprises the actions of:

receiving from the server via client computer a server identification and server challenge number;

generating the secret value;

generating a mobile device challenge number;

generating a server verification value in the form of a combination comprising a user identification, the server identification, the secret value and the server challenge number;

generating a mobile device verification value in the form of a combination comprising the user identification, the server identification, the secret value and the mobile device challenge number;

generating a session key comprising a combination of the user identification, the server identification, the server verification value, and mobile device verification value; and generating the secret value representation as a combination comprising the session key and the user and server identifications.

13. The process of claim 12, further comprising, whenever the server has granting access to the network site, the process actions of:

receiving from the server via the client computer, a server authentication value for the mobile device comprising a combination of the user identification, the server identification and a server-generated version of the session key;

deriving a mobile device-generated version of the session key;

ensuring that the mobile device-generated session key matches the server-generated version of the session key used in generating the server authentication value; and only allowing communication of prescribed high security data between the server and the mobile device via the client computer if the mobile device-generated session key matches the server-generated version of the session key.

14. In a system comprising a server which is in communication with a client computer over a computer network, and a mobile device which is in the possession of a user of the client computer and which is in communication with the client computer, a process for conducting communications over the computer network, the process comprising using said server to perform the following process actions:

authenticating the user who is attempting to access a network site associated with the server, wherein said authenticating comprises, generating a challenge number, providing a server identification and the server-generated challenge number to the mobile device via the client computer;

receiving a user identification, a mobile device-generated challenge number and a combined representation from the client computer, wherein the combined representation is a combination comprising the user identification, the server identification, a mobile device-generated secret value representation comprising a secret value, and a password which was entered into the client computer by the user, and wherein the secret value, as well as the password, are known to the server, and wherein said secret value is a combination comprising a hidden number stored by the mobile device, a site identification which is unique to the network site the user is attempting to access, and a mobile device identification number, computing a session key comprising a combination of the user identification, the server identification, a plurality of unique numbers which are generated by the server and mobile device, computing a server version of the secret value representation as a combination comprising the session key, the user identification and the server identification, computing a server version of the combined representation using the user identification, the server identification, the server version of the secret value representation, and the password known to the server, comparing the server version of the combined representation to the combined representation received from the client computer, determining if the password and secret value known to the server were used to generate the combined representation received from the client computer, and transmitting a notice to the client computer as to whether access to said network site has been granted or not, wherein access is granted only if the password and secret value known to the server were used to generate the combined representation received from the client computer.

15. The process of claim 14, wherein the process action of computing the session key, comprises the action of:

deriving a mobile device-generated authentication number from the mobile device-generated challenge number using the secret value known to the server; and computing the session key comprising a combination of the user identification, the server identification, the server-generated challenge number, the mobile device-generated challenge number, and a verification value created from the server challenge number and the mobile device-generated authentication number.

16. The process of claim 15, wherein:

the process action of deriving the mobile device-generated authentication number from the mobile device-generated challenge number $(X_m)$ using the secret value known to the server, comprises the actions of, computing $D_l(X_m)$ wherein $D_l(\bullet)$ is the one of a pair of prescribed symmetric encryption algorithms having l as the secret key that was not used by the mobile device to generate the mobile device-generated challenge number, and wherein l is the secret value known to the server, and designating the result of the $D_l(X_m)$ computation as mobile device-generated authentication number $g^{n_m}$; and wherein the process action of generating the server-generated challenge number, comprises the actions of, randomly choosing a number $n_s$ from prescribed set of numbers $Z_q^*$, and computing $g^{n_s}$ mod p wherein g is a prescribed number in $Z_q^*$ with order q, and wherein p and q are large prime numbers such that q|p−1.

17. The process of claim 14, further comprising, whenever a notice is transmitted granting access to the network site, a process action of transmitting a server authentication value to the client computer comprising a combination of the password known to the server and the server-generated version of the secret value representation, such that the server authentication value can be used by the client computer to verify that the password used in generating the server-generated combination matches the password entered by the user, and that the mobile device-generated secret value representation matches the server-generated version of the secret value representation used in generating the server-generated combination, thereby proving the authenticity of the server.

18. The process of claim 14, further comprising, whenever a notice is transmitted granting access to the network site, a process action of transmitting the server-generated version of the secret value representation to the mobile device via the client computer, such that the server-generated version of the secret value representation can be used by the mobile device to verify that the mobile device-generated secret value representation matches the server-generated version of the secret value representation, thereby proving the authenticity of the server.

19. The process of claim 14, wherein the process action of computing the session key, comprises the action of:
- generating a server verification value in the form of a combination comprising the user identification, the server identification, the secret value and the server challenge number;
- generating a mobile device verification value in the form of a combination comprising the user identification, the server identification, the secret value and the mobile device challenge number; and
- generating the session key comprising a combination of the user identification, the server identification, the server verification value, and mobile device verification value.

20. The process of claim 14, further comprising, whenever a notice is transmitted granting access to the network site, the process actions of:
- transmitting data previously identified as high security data to the mobile device via the client computer using a security protocol employing the previously computed session key, said transmitting comprising,
  - choosing a nonce,
  - generating a combination of a current time value, the nonce and the high security data being transmitted,
  - applying one of a pair of prescribed symmetric encryption algorithms having the session key as its secret key to the generated combination, to produce a secure transmission, and
  - transmitting the secure transmission to the mobile device via the client computer; and
- receiving secure feedback from the mobile device in response to the previously transmitted secure transmission which has been encrypted by the mobile device using said security protocol employing the previously computed session key, said receiving comprising,
  - inputting the mobile device-encrypted secure feedback, and
  - decrypting the secure feedback, which has been encrypted by the mobile phone via said security protocol comprising generating a combination of the nonce and feedback, and applying one of said pair of prescribed symmetric encryption algorithms having the session key as its secret key, to the generated combination, to produce the secure feedback, wherein the decrypting comprises,
    - applying the one of said pair of prescribed symmetric encryption algorithms, which was not employed by the mobile device to encrypt the secure feedback, to the encrypted secure feedback, and
    - deriving the nonce and feedback from the decrypted combination,
  - comparing the derived nonce to the nonce chosen by the server and used in the producing the secure transmission to ensure the nonces match, and
  - whenever the nonces match, accepting the feedback.

* * * * *